(12) United States Patent
Kanemoto et al.

(10) Patent No.: US 7,951,326 B2
(45) Date of Patent: May 31, 2011

(54) HYDROGEN ABSORBING ALLOY, HYDROGEN ABSORBING ALLOY ELECTRODE, SECONDARY BATTERY AND PRODUCTION METHOD OF HYDROGEN ABSORBING ALLOY

(75) Inventors: Manabu Kanemoto, Kyoto (JP); Tadashi Kakeya, Kyoto (JP); Minoru Kuzuhara, Kyoto (JP); Masaharu Watada, Kyoto (JP); Tetsuo Sakai, Osaka (JP); Tetsuya Ozaki, Kyoto (JP)

(73) Assignees: GS Yuasa International Ltd., Kyoto (JP); National Institute of Advanced Industrial Science and Technology, Tokyo (JP)

( * ) Notice: Subject to any disclaimer, the term of this patent is extended or adjusted under 35 U.S.C. 154(b) by 605 days.

(21) Appl. No.: 12/063,394

(22) PCT Filed: Aug. 11, 2006

(86) PCT No.: PCT/JP2006/315945
§ 371 (c)(1),
(2), (4) Date: Feb. 8, 2008

(87) PCT Pub. No.: WO2007/018292
PCT Pub. Date: Feb. 15, 2007

(65) Prior Publication Data
US 2009/0226342 A1 Sep. 10, 2009

(30) Foreign Application Priority Data

Aug. 11, 2005 (JP) ................................. 2005-233533
Aug. 11, 2005 (JP) ................................. 2005-233781

(51) Int. Cl.
*C22C 19/03* (2006.01)
(52) U.S. Cl. ...................................................... 420/455
(58) Field of Classification Search .................... 420/455
See application file for complete search history.

(56) References Cited

FOREIGN PATENT DOCUMENTS

| JP | 11-100601 | 4/1999 |
|---|---|---|
| JP | 11-323469 | 11/1999 |
| JP | 3015885 | 12/1999 |
| JP | 2000-21439 | 1/2000 |
| JP | 2000-80429 | 3/2000 |
| JP | 2000-265229 | 9/2000 |

(Continued)

OTHER PUBLICATIONS

International Search Report for PCT/JP2006/315945 mailed Oct. 3, 2006, Japanese Patent Office, 2 pgs.

(Continued)

*Primary Examiner* — Roy King
*Assistant Examiner* — Jessee R. Roe
(74) *Attorney, Agent, or Firm* — Sterne, Kessler, Goldstein & Fox P.L.L.C.

(57) ABSTRACT

The present invention provides a hydrogen absorbing alloy containing a phase of a $Pr_5Co_{19}$ type crystal structure having a composition defined by a general formula $A_{(4-w)}B_{(1+w)}C_{19}$ (A denotes one or more element(s) selected from rare earth elements including Y (yttrium); B denotes an Mg element; C denotes one or more element(s) selected from a group consisting of Ni, Co, Mn, and Al; and w denotes a numeral in a range from −0.1 to 0.8) and having a composition as a whole defined by a general formula $R1_xR2_yR3_z$ ($15.8 \leq x \leq 17.8$, $3.4 \leq y \leq 5.0$, $78.8 \leq z \leq 79.6$, and $x+y+z=100$; R1 denotes one or more element(s) selected from rare earth elements including Y (yttrium); R2 denotes an Mg element, R3 denotes one or more element(s) selected from a group consisting of Ni, Co, Mn, and Al; the numeral of Mn+Al in the z is 0.5 or higher; and the numeral of Al in the z is 4.1 or lower).

7 Claims, 7 Drawing Sheets

○ La (rare earth element)
◉ La/Mg
◎ M (transition metal, Al)

FOREIGN PATENT DOCUMENTS

| | | |
|---|---|---|
| JP | 2002-105563 | 4/2002 |
| JP | 2002-105564 | 4/2002 |
| JP | 2002-164045 | 6/2002 |
| JP | 3397981 | 2/2003 |
| JP | 3490871 | 11/2003 |
| JP | 2004-115870 | 4/2004 |
| JP | 2004-273346 | 9/2004 |
| JP | 2005-23341 | 1/2005 |
| WO | WO 01/48841 A1 | 7/2001 |

OTHER PUBLICATIONS

International Preliminary Report on Patentability from the International Bureau of WIPO, issued Feb. 12, 2008, 4 pgs.

HYDROGEN ABSORBING ALLOY, HYDROGEN ABSORBING ALLOY ELECTRODE, SECONDARY BATTERY AND PRODUCTION METHOD OF HYDROGEN ABSORBING ALLOY

TECHNICAL FIELD

The present invention relates to a hydrogen absorbing alloy, a hydrogen absorbing alloy electrode, a secondary battery, and a production method of a hydrogen absorbing alloy.

BACKGROUND ART

A hydrogen absorbing alloy is an alloy capable of safely and easily storing hydrogen as an energy source and therefore the alloy has drawn lots of attention as a new material for energy conversion and storage.

Application fields of the hydrogen absorbing alloy as a functional material have been proposed in a wide range such as storage and transportation of hydrogen, storage and transportation of heat, heat-mechanical energy conversion, separation and refining of hydrogen, separation of hydrogen isotopes, batteries using hydrogen as an active mass, catalysts for synthetic chemistry, and temperature sensors.

For instance, a nickel-hydrogen storage battery using a hydrogen absorbing alloy as a negative electrode material has following characteristics; (a) having a high capacity; (b) highly durable to overcharge and overdischarge; (c) capable of charging and discharging at high efficiency; and (d) is clean and therefore, the battery has drawn attention as a consumer battery and to further improve functions and capabilities (e.g. to improve charging and discharging cycle characteristics and capacities of batteries), its applications and practical uses have been actively promoted.

As an electrode material for a nickel-hydrogen storage battery, which is one application example of such a hydrogen absorbing alloy, are practically used $AB_5$ type rare earth-Ni based alloys having a $CaCu_5$ type crystal structure; however, the discharge capacity of the alloy is limited to about 300 mAh/g and it is difficult to further increase the capacity in the present state.

On the other hand, in recent years, various kinds of rare earth-Mg—Ni based alloys have drawn attention as new hydrogen absorbing alloys provided with durability which $AB_5$ based hydrogen absorbing alloys have and a high capacity which $AB_2$ based hydrogen absorbing alloys have in combination and it is reported that use of the alloys as an electrode makes it possible to have a discharge capacity exceeding that achieved by using an $AB_5$ type alloy.

For instance, the following Patent Document 1 discloses electrodes containing $LaCaMgNi_9$ alloys having a $PuNi_3$ type crystal structure.

Patent Document 1: Japanese Patent No. 3015885

However, although having large hydrogen absorption capacities, the alloys described in Patent Document 1 have a problem that the alloys have low hydrogen releasing speeds (in other words, being inferior in the rate characteristics).

Further, Patent Document 2 discloses hydrogen absorbing alloys containing a phase of intermetallic compounds defined as $La_5Ni_{19}$ and additionally hydrogen absorbing alloys containing a phase of intermetallic compounds defined as $(La-M)_5Ni_{19}(M:Ca, Mg)$. The hydrogen absorbing alloys described in Patent Document 2 are produced by mechanical alloying using two or more types of different hydrogen absorbing alloys as the material.

Patent Document 2: Japanese Patent No. 3397981

Further, the following Patent Documents 3 to 5 disclose that electrodes using rare earth-Mg—Ni based alloys having crystal structures such as a $CeNi_3$ type, a $Gd_2Co_7$ type, a $Ce_2Ni_7$ type, and a $PuNi_3$ type show good hydrogen releasing characteristics while keeping high hydrogen storage capacities.

Patent Document 3: Japanese Patent Application Laid-Open (JP-A) No. 11-323469

Patent Document 4: JP-A No. 2002-273346

Patent Document 5: JP-A No. 2002-105563

Further, the following Patent Document 6 discloses that with respect to alloys having a $Ce_5Co_{19}$ type crystal structure, electrodes produced using the alloys compounded with rare earth-Ni alloys having a $CaCu_5$ type crystal structure are excellent in terms of a hydrogenation reaction speed.

Patent Document 6: Japanese Patent No. 3490871

Further, other than the above-mentioned patent documents, as hydrogen absorbing alloys for providing hydrogen absorbing alloy electrodes with high capacities have been proposed many kinds of rare earth element-Mg—Ni based hydrogen absorbing alloys and hydrogen absorbing alloys containing the respective elements of rare earth element-Mg—Ni based alloys as main constituent elements and additionally elements such as Cu, Co, Mn, and Al as other constituent elements (e.g. Patent Documents 7 to 10).

Patent Document 7: JP-A No. 2000-80429

Patent Document 8: JP-A No. 2004-115870

Patent Document 9: JP-A No. 2000-265229

Patent Document 10: JP-A No. 2000-21439

DISCLOSURE OF THE INVENTION

Problems to be Solved by the Invention

However, although these rare earth-Mg—Ni based alloys known as conventional techniques are excellent in easiness of attaining excellent discharge capacities as compared with $AB_5$ type rare earth based alloys in the case of being used for hydrogen absorbing electrodes, these alloys have a problem that the alloys are easy to decrease in the discharge capacity and discharge speed in the case charging and discharging are repeated and thus inferior in the cycle characteristics and rate characteristics.

Further, it is required for the $AB_5$ type rare earth based alloys to use costly Co as an indispensable component to increase the cycle characteristics and in this case, it results in a problem that the production cost is high.

In view of the above problems of the conventional techniques, it is one object of the present invention to provide a hydrogen absorbing alloy having a high capacity and excellent in the cycle characteristics. Further, another object of the present invention is to provide a hydrogen absorbing alloy having a high capacity and excellent in the cycle characteristics economically.

Means for Solving the Problems

The present inventors have made various investigations to solve the above-mentioned problems and have found that a hydrogen absorbing alloy containing a certain specific crystal structure has a high capacity and is excellent in durability to charging and discharging cycles and have finally accomplished the invention.

That is, the present invention provides a hydrogen absorbing alloy containing a phase of a $Pr_5Co_{19}$ type crystal structure having a composition defined by a general formula $A_{(4-w)}B_{(1+w)}C_{19}$ (A denotes one or more element(s) selected from rare earth elements including Y (yttrium); B denotes an Mg element; C denotes one or more element(s) selected from a group consisting of Ni, Co, Mn, and Al; and w denotes a numeral in a range from −0.1 to 0.8) and having a composition as a whole defined by a general formula $R1_xR2_yR3_z$ ($15.8 \leq x \leq 17.8, 3.4 \leq y \leq 5.0, 78.8 \leq z \leq 79.6$, and $x+y+z=100$; R1 denotes one or more element(s) selected from rare earth elements including Y (yttrium); R2 denotes an Mg element, R3 denotes one or more element(s) selected from a group consisting of Ni, Co, Mn, and Al; the numeral of Mn+Al in the z is 0.5 or higher; and the numeral of Al in the z is 4.1 or lower).

The hydrogen absorbing alloy of the present invention contains the phase of the $Pr_5Co_{19}$ crystal structure which is completely different from those disclosed in the above-mentioned patent documents, so that the alloy has a high capacity and is excellent in durability to charging and discharging cycles.

Herein, x, y, and z denote the ratios based on numbers of elements but not weight %.

Further, the above-mentioned $Pr_5Co_{19}$ type crystal structure is a hexagonal crystal system belonging to a space group of $P6_3/mmc$ and has a ratio of c-axis length/a-axis length of the lattice constant in a range of 6.2 to 6.6.

Further, the present invention also provides the hydrogen absorbing alloy wherein in the general formula $R1_xR2_yR3_z$, x, y, and z satisfy $16.3 \leq x \leq 17.6$, $3.6 \leq y \leq 4.7$, and $78.8 \leq z \leq 79.1$; the numeral of Mn+Al in the z is 1.6 or higher; and the numeral of Al in the z is 1.9 or lower.

If the configuration is as described above, the formation ratio of the phase of the $Pr_5Co_{19}$ crystal structure can be increased and the hydrogen absorbing alloy can have a high capacity and is more excellent in the durability to charging and discharging cycles.

Further, the hydrogen absorbing alloy according to the present invention is preferable to contain 8 weight % or more of the phase of the $Pr_5Co_{19}$ crystal structure.

If the configuration is as described above, the alloy has a further higher capacity and is more excellent in the durability to charging and discharging cycles.

The present invention also provides a hydrogen absorbing alloy production method for producing the above-mentioned hydrogen absorbing alloy by cooling a melted alloy at a cooling speed of 1000 K/second or more and further annealing the obtained alloy at a temperature in a range from 860 to 1020° C. in an inert gas atmosphere under a pressurized state.

According to the above-mentioned production method, the formation ratio of the phase of the $Pr_5Co_{19}$ crystal structure, which is a metastable phase, can be increased and it is made possible to obtain a hydrogen absorbing alloy with a high capacity.

Herein, the melted alloy means a substance obtained by weighing prescribed amounts of raw material ingots (materials) based on the composition of the intended hydrogen absorbing alloy and heating and melting these materials.

Further, the present inventors of have found that during production of the above-mentioned hydrogen absorbing alloy containing the phase of the $Pr_5Co_{19}$ type crystal structure, the production of the phase of the $Pr_5Co_{19}$ type crystal structure can be promoted by melting annealing the alloy in the state that a prescribed ratio or more of Cu is added and accordingly have accomplished the present invention.

That is, the present invention provides a hydrogen absorbing alloy containing 15 weight % or higher of a phase of a $Pr_5Co_{19}$ type crystal structure and obtained by melting and annealing in the state that the content of a Cu element is controlled to be 1 to 8 mol %.

Since being produced by melting and annealing in the state that the content of a Cu element, which is an indispensable component of the alloy, is controlled to be 1 to 8 mol %, the hydrogen absorbing alloy of the present invention contains the phase of the $Pr_5Co_{19}$ type crystal structure at a ratio of 15 weight % or higher and accordingly is provided with a high hydrogen storage capacity and the excellent cycle characteristics. Further, as compared with Co, Cu is relatively economical and therefore, the hydrogen absorbing alloy having the above-mentioned excellent properties can be provided at a relatively low cost.

In the present invention, the composition of the alloy as a whole is preferably defined by a general formula $R1_aR2_bR3_cCu_d$ (R1 denotes one or more element(s) selected from rare earth elements including Y (yttrium); R2 denotes one or more element(s) selected from a group consisting of Mg, Ca, Sr, and Ba; R3 denotes one or more element(s) selected from a group consisting of Ni, Co, Mn, Al, Fe, Cr, Zn, Si, Sn, V, Nb, Ta, Ti, Zr, and Hf, and a, b, c, and d denote numerals satisfying $15 \leq a \leq 19, 2 \leq b \leq 7, 70 \leq c \leq 80, 1 \leq d \leq 7$, and $a+b+c+d=100$, respectively).

With respect to the hydrogen absorbing alloy of the present invention, it is preferable that the R2 is Mg and the R3 is one or more element(s) selected from a group consisting of Co, Mn, Al, and Ni.

Further, the present invention provides a hydrogen absorbing alloy production method for producing the above-mentioned hydrogen absorbing alloy by cooling a melted alloy at a cooling speed of 1000 K/second or more and further annealing the obtained alloy at a temperature in a range from 860 to 980° C. in an inert gas atmosphere in a pressurized state. The temperature range of annealing is preferably from 920 to 970° C.

The hydrogen absorbing alloy of the present invention is preferable to have a primary grain size of the alloy of 10 to 100 nm.

Generally, if a hydrogen absorbing alloy is finely powdered (to have an extremely small particle size), the crystal structure tends to be easily broken up and accordingly the durability is lowered, however if having such a configuration, pulverization of the alloy at the time of absorbing and releasing hydrogen can be suppressed and thus the durability is further improved.

The hydrogen absorbing alloy electrode of the present invention uses the above-mentioned hydrogen absorbing alloy as a hydrogen storage medium and the secondary battery of the present invention employs the hydrogen absorbing alloy electrode as a negative electrode.

EFFECTS OF THE INVENTION

As described above, the hydrogen absorbing alloy of the present invention has a high hydrogen storage capacity in the case the alloy is used for a hydrogen absorbing electrode and excellent durability even in the case charging and discharging are repeated.

The secondary battery of the present invention employs, as a negative electrode, the hydrogen absorbing alloy electrode using the hydrogen absorbing alloy having the above-mentioned properties as a hydrogen storage medium and accordingly is provided with a high capacity and an excellent cycle characteristic as compared with those using a conventional AB$_5$ type rare earth based alloy.

BEST MODE FOR CARRYING OUT THE INVENTION

A first embodiment of the hydrogen absorbing alloy of the present invention contains a phase of a Pr$_5$Co$_{19}$ type crystal structure having a composition defined by a general formula A$_{(4-w)}$B$_{(1+w)}$C$_{19}$ (A denotes one or more element(s) selected from rare earth elements including Y (yttrium); B denotes an Mg element; C denotes one or more element(s) selected from a group consisting of Ni, Co, Mn, and Al; and w denotes a numeral in a range from −0.1 to 0.8).

Since the alloy contains the phase of a Pr$_5$Co$_{19}$ type crystal structure having a composition defined by the above-mentioned general formula A$_{(4-w)}$B$_{(1+w)}$C$_{19}$, the resulting hydrogen absorbing alloy has a high capacity and excellent durability to charging and discharging cycles. That is, the Pr$_5$Co$_{19}$ type crystal structure defined by the general formula A$_{(4-w)}$B$_{(1+w)}$C$_{19}$, is a layered structure composed of three AB$_5$ units of a CaCu$_5$ type crystal structure and one A$_{(1-w)}$B$_{(1+w)}$C$_4$ unit of a Laves structure and since the element A (rare earth element) with a larger atom radium and the element B (Mg) with a smaller atom radium exist at a ratio of w=−0.1 to 0.8 in the A$_{(1-w)}$B$_{(1+w)}$C$_4$ unit, the strains among the units are lowered to give a lattice volume suitable for reversible hydrogen storage and release. If w is lower than −0.1, the ratio of the rare earth elements is increased, strains among the units are increased and the lattice volume is also increased, and accordingly hydrides are to exist in a stable state to result in difficulty in the release of stored hydrogen. If w is higher than 0.8, the ratio of Mg is increased and the lattice constant is lowered to supposedly result in difficulty in storing hydrogen.

The existence and the amount (weight %) of the phase of the Pr$_5$Co$_{19}$ type crystal structure can be evaluated by carrying out x-ray diffraction of, for instance, a milled hydrogen absorbing alloy powder and analyzing the obtained x-ray diffraction pattern by a Rietveld method. More specifically, the existence and the amount can be measured by the method described in Examples.

Figure 1:
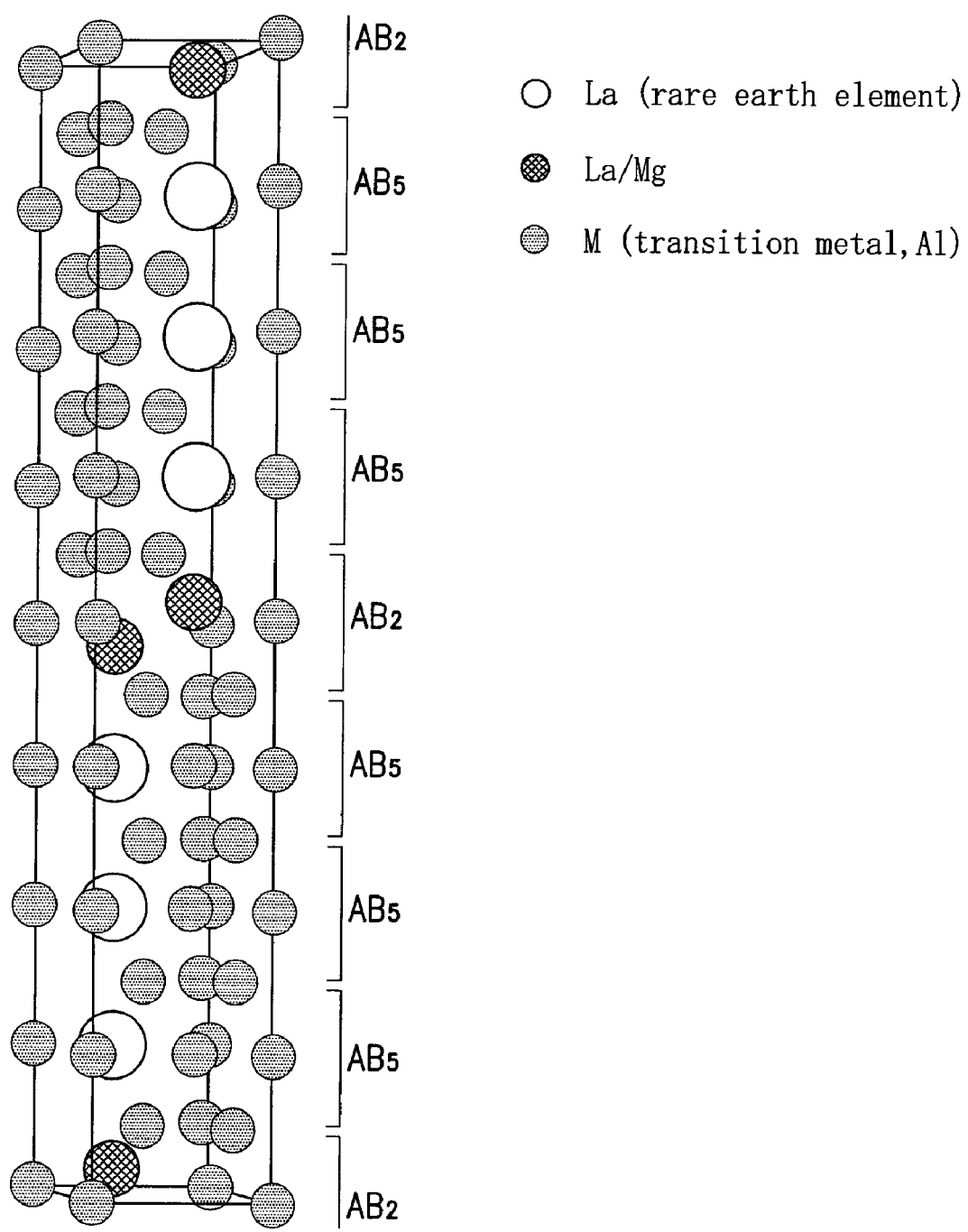
FIG. 1: A drawing showing a structure model of a Pr$_5$Co$_{19}$ type crystal structure.

FIG. 1 shows a structure model of the phase of the Pr$_5$Co$_{19}$ crystal structure. According to the structure analysis by x-ray diffraction and a Rietveld method, it is understood that the above-mentioned phase of the Pr$_5$Co$_{19}$ crystal structure has the structure model shown in FIG. 1.

The specific crystal structure of the above-mentioned phase of the Pr$_5$Co$_{19}$ type crystal structure is shown in the following.

The crystal system belongs to a hexagonal system and the space group belongs to P6$_3$/mmc.

As lattice parameters, the a-axis length is in a range from 4.980 to 5.080 Å and the c-axis length is in a range from 30.88 to 33.53 Å.

The ratio of the c-axis length/a-axis length of the lattice constant is 6.20 to 6.60 and V (volume) is 663.1 to 749.3 Å$^3$.

The hydrogen absorbing alloy of the first embodiment of the present invention has a composition of the whole alloy defined by a general formula R1$_x$R2$_y$R3$_z$ (in the formula, $15.8 \leq x \leq 17.8$, $3.4 \leq y \leq 5.0$, $78.8 \leq z \leq 79.6$, and x+y+z=100; R1 denotes one or more element(s) selected from rare earth elements including Y (yttrium); R2 denotes an Mg element, R3 denotes one or more element(s) selected from a group consisting of Ni, Co, Mn, and Al; the numeral of Mn+Al in the z is 0.5 or higher; and the numeral of Al in the z is 4.1 or lower). Further, it is preferable that x, y, and z in the general formula R1$_x$R2$_y$R3$_z$ satisfy $16.3 \leq x \leq 17.6$, $3.6 \leq y \leq 4.7$, and $78.8 \leq z \leq 79.1$; the numeral of Mn+Al in the z is 1.6 or higher; and the numeral of Al in the z is 1.9 or lower.

The hydrogen absorbing alloy of the first embodiment of the present invention contains, as R1, one or more element(s) selected from rare earth elements including Y (yttrium), that is, a group consisting of La, Ce, Pr, Nd, Sm, Eu, Gd, Tb, Dy, Ho, Er, Tm, Yb, Lu, Sc, and Y and in terms of the hydrogen dissociation equilibrium pressure, particularly La, Ce, Pr, and Nd are preferable.

Further, a Misch metal (Mm), a mixture of rare earth elements, is economical and therefore preferably used.

The hydrogen absorbing alloy of the first embodiment of the present invention contains, as R2, an Mg element. Use of an Mg element improves the hydrogen storage capacity and the durability.

The hydrogen absorbing alloy of the first embodiment of the present invention contains, as R3, at least one of Mn and Al and the numeral of Mn+Al (that is, the composition ratio of Mn+Al in the alloy as a whole) in the z is 0.5 or higher and preferably 1.6 or higher.

If the composition ratio of Mn+Al is 0.5 or higher, the production amount of the phase of the Pr$_5$Co$_{19}$ crystal structure can be increased.

The composition ratio of Mn is preferably 0.2 to 3.7 and more preferably 1.0 to 3.7.

If the ratio of Mn is within the above-mentioned range, it is made possible to improve the capacity while keeping the phase of the Pr$_5$Co$_{19}$ crystal structure.

Further, R3 is preferable to include Ni. Use of Ni as an indispensable element makes the property of absorbing and releasing hydrogen better.

In the above-mentioned alloy composition, as described above, the ratio of Al is 4.1 or lower and preferably 1.9 or lower.

If the composition is within the above-mentioned range, the production amount of the phase of the Pr$_5$Co$_{19}$ crystal structure can be increased. If the composition ratio of Al exceeds 4.1, the production amount of the phase of the $Pr_5Co_{19}$ crystal structure is considerably decreased and the hydrogen storage capacity and durability are deteriorated.

Specific compositions of the hydrogen absorbing alloy of the first embodiment of the present invention may include, for instance, $La_{16.9}Mg_{4.1}Ni_{69.2}Co_{6.0}Mn_{1.9}Al_{1.9}$,
$La_{16.9}Mg_{4.1}Ni_{71.1}Co_{5.8}Mn_{1.0}Al_{1.1}$,
$La_{17.0}Mg_{4.2}Ni_{77.0}Mn_{1.8}$, $La_{17.2}Mg_{4.0}Ni_{73.3}Cu_{3.9}Mn_{1.6}$,
$La_{12.8}Pr_{4.0}Mg_{3.6}Ni_{72.1}Co_{4.4}Mn_{3.1}$,
$La_{13.4}Ce_{4.2}Mg_{3.6}Ni_{71.1}Co_{4.0}Mn_{3.7}$,
$La_{13.9}Ce_{2.1}Nd_{0.8}Mg_{4.1}Ni_{72.2}Co_{4.0}Mn_{2.9}$,
$La_{14.1}Ce_{2.0}Nd_{0.9}Mg_{4.1}Ni_{76.3}Mn_{2.6}$,
$La_{17.6}Mg_{3.6}Ni_{76.4}Mn_{1.4}Al_{1.0}$,
$La_{17.8}Mg_{3.4}Ni_{68.2}Co_{6.4}Mn_{2.1}Al_{2.1}$,
$La_{16.3}Mg_{4.7}Ni_{69.9}Cu_{6.0}Mn_{2.0}Al_{1.1}$,
$La_{15.8}Mg_{5.0}Ni_{71.1}Co_{4.1}Mn_{2.0}Al_{2.0}$,
$La_{17.0}Mg_{4.1}Ni_{73.9}Mn_{0.9}Al_{4.1}$, and
$La_{17.0}Mg_{4.1}Ni_{73.7}Cu_{4.7}Mn_{0.2}Al_{0.3}$.

The hydrogen absorbing alloy of the first embodiment of the present invention contains the phase of the $Pr_5Co_{19}$ type crystal structure and generally the phase of the $Pr_5Co_{19}$ type crystal structure exists in an amount of 8 weight % or more, preferably 65 weight % or more, and more preferably 79 weight % or more in the alloy. The upper limit is not particularly limited, however it is generally about 95 weight %.

The higher the existence ratio of the phase of the $Pr_5Co_{19}$ type crystal structure becomes, the higher the capacity becomes.

The phase of the $Pr_5Co_{19}$ type crystal structure has, as shown in the crystal structure model in FIG. 1, the stacking structure of the $AB_2$ units and the $AB_5$ units and the ratio of the $AB_5$ units, which have higher durability, is higher and it is supposed that Mn or Al added in the alloy moderates the strains caused between neighboring $AB_2$ units and $AB_5$ units and accordingly the stability of the crystal structure is increased to improve the durability of the alloy.

Further, the strains in other produced phases and grain boundaries are moderated to suppress pulverization. Since pulverization is suppressed, the contact surface area of an alkaline electrolyte and the hydrogen absorbing alloy is lessened and accordingly, corrosion of the hydrogen absorbing alloy is suppressed, the cycle life is improved, and excellent durability is provided.

Further, it is also supposed that, as compared with the conventional $CeNi_3$ type and $PuNi_3$ type, since the Mg content contained in the crystal is low, the alkali resistance is improved.

The existence ratio (weight %) of the phase of the $Pr_5Co_{19}$ type crystal structure in the hydrogen absorbing alloy of the present invention can be measured by the method described in Examples.

As other produced phases, phases of crystal structures such as a $CeNi_3$ type, a $PuNi_3$ type, a $Ce_2Ni_7$ type, $Ce_5Co_{19}$ type, and a $CaCu_5$ type can be exemplified.

The hydrogen absorbing alloy of one embodiment of the present invention preferably has a primary grain size of the alloy in a range of 10 to 100 nm.

Control of the primary grain size within the range of 10 to 100 nm moderates volume expansion caused along with hydrogen absorption and makes occurrence of pulverization difficult. Further, phase transformation due to rearrangement of atoms is easily caused during heat treatment to produce the phase of the $Pr_5Co_{19}$ crystal structure easily.

In the case the primary grain size exceeds 100 nm, the cycle characteristic is deteriorated due to pulverization and in the case it is smaller than 10 nm, deterioration due to oxidation tends to be caused easily.

The primary grain size can be measured by transmission electron microscopic observation described in Examples.

The hydrogen absorbing alloy according to the first embodiment of the present invention is preferable to have an average particle size of secondary grains in a range of 20 to 60 μm.

If the average particle size of the secondary grains is within the above-mentioned range, a good high rate discharge characteristics can be obtained and also corrosion by a strongly alkaline electrolyte can be suppressed and the durability is further improved.

The secondary grains mean grains of polycrystalline bodies formed by bonding a plurality of primary grains.

Figure 2:
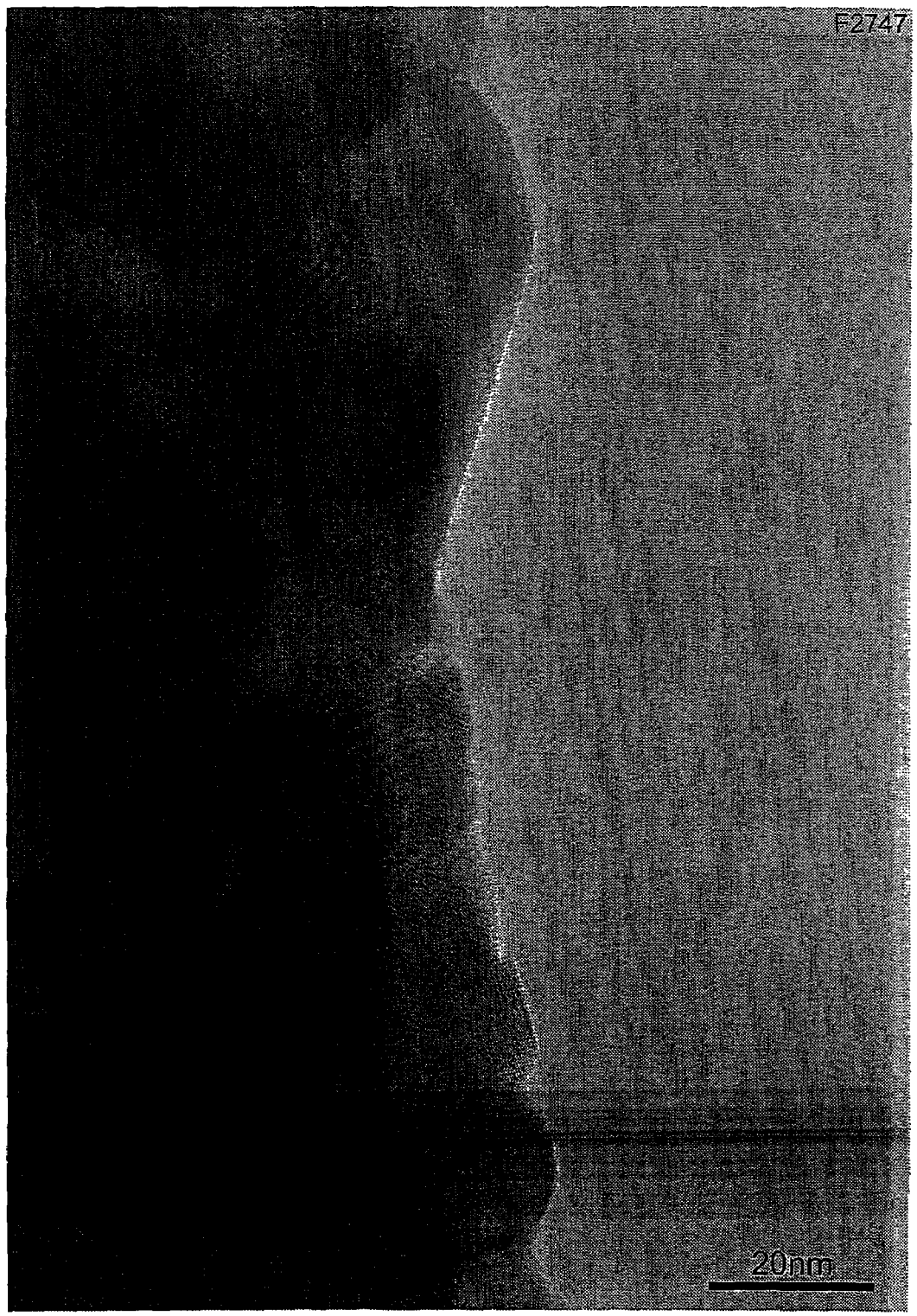
FIG. 2: A drawing showing a transmission electron microscopic photograph (TEM image) of secondary particles.

FIG. 2 shows a transmission electron microscopic photograph (TEM image) of the secondary grains.

The hydrogen absorbing alloy of one embodiment of the present invention can be obtained by mixing raw material ingots (materials) in proper amounts to give a prescribed alloy composition, melting the ingots, and annealing the coarse product, which is obtained by cooling and solidifying the melt, in a temperature range of 860 to 1020° C.

First, prescribed amounts of raw material ingots (materials) are weighed in accordance with the composition of the intended hydrogen absorbing alloy and the raw material ingots are put in a crucible and heated to 1200 to 1600° C. using a high frequency melting furnace in an inert gas atmosphere or vacuum to melt the materials.

Thereafter, the melted alloy obtained by melting the above-mentioned materials is cooled and at this time, the cooling speed for cooling the melted alloy is adjusted to be 1000 K/second or more.

Quenching of the melted alloy at 1000 k/second or more in such a manner makes it possible to produce an alloy phase (the phase of the $Pr_5Co_{19}$ crystal structure) of the present invention, which is a metastable phase, at high efficiency.

A cooling method for solidification by quenching may be a melt spinning method capable of quenching at a cooling speed of 100,000 K/second or more.

Another usable cooling method may be, for example, a mold method (capable of cooling at a cooling speed of 1,000 K/second) or a gas atomizing method (capable of cooling at a cooling speed of 10,000 K/second).

Next, after quenching solidification of the alloy, to improve the production ratio of the intended alloy phase, heat treatment is carried out using an electric furnace in an inert gas atmosphere in a pressurized state. The heat treatment (annealing) to be carried out in the electric furnace is preferably performed at a temperature in the furnace in a range of 860 to 1020° C. for 3 to 50 hours.

The lower temperature limit and the upper temperature limit of the above-mentioned heat treatment are defined as 860° C. and 1020° C., respectively, to improve the production ratio of the phase of the $Pr_5Co_{19}$ type crystal structure.

The heat treatment is carried out for 3 hours at minimum, so that the intended phase of the $Pr_5Co_{19}$ crystal structure can be produced at a high ratio. Heat treatment for a duration exceeding 50 hours is not preferable since a stable phase such as a phase of a $LaNi_5$ crystal structure appears.

The heat treatment conditions are more preferably at 900 to 980° C. for 5 to 10 hours.

The reason that the heat treatment atmosphere is controlled to be an inert gas (e.g. argon or helium) atmosphere in a pressurized state is because oxidation of the material can be prevented and at the same time evaporation of magnesium can be prevented during the heat treatment.

Particularly, a helium gas atmosphere is preferable since the effect of preventing magnesium evaporation is significant.

At the time of carrying out the heat treatment under an inert gas, the pressure range is 0.1 MPa or higher and preferably in a range of 0.2 to 0.5 MPa (gauge pressure).

If the heat treatment is carried out in the above-mentioned pressure range, it is made possible to obtain a hydrogen absorbing alloy more excellent in durability.

In this connection, even if the heat treatment is carried out in the pressure range, the heat treatment temperature is preferably 900 to 980° C.

It is made possible to obtain a hydrogen absorbing alloy containing a large quantity of the phase of the $Pr_5Co_{19}$ crystal structure by carrying out the heat treatment at the above-mentioned temperature and duration in an inert gas atmosphere in a pressurized state.

Next, the hydrogen absorbing alloy of a second embodiment of the present invention will be described.

The hydrogen absorbing alloy according to the second embodiment of the present invention is obtained by melting and annealing alloy raw materials to have a content of a Cu element in a range of 1 to 8 mol % and forming the phase of the $Pr_5Co_{19}$ type crystal structure at a ratio of 15 weight % or higher. The phase of the $Pr_5Co_{19}$ type crystal structure is the same as described in the first embodiment.

The phase of the $Pr_5Co_{19}$ type crystal structure is intrinsically a metastable phase, however it is stabilized by addition of a Cu element and the production ratio is remarkably increased. Although the cause of remarkable increase of the production ratio is unclear, it is supposed due to that specific element sites of Ni or the like sandwiched between rare earth element sites or Group IIA element (Mg, Ca, Sr, or Ba) sites are selectively replaced with Cu.

Further, it is also supposed that the alloy corrosion is suppressed and the cycle characteristic is improved since the phase of the $Pr_5Co_{19}$ type crystal structure is stable to an alkaline electrolyte and the primary grains of the crystal phases of the $Pr_5Co_{19}$ type crystal structure exist in grain boundaries of primary grains of other crystal phases of the $Ce_2Ni_7$ type crystal phase or the like and the crystal phases of the $Ce_2Ni_7$ type crystal phase or the like decrease chances of the direct contact of the primary grains with an electrolyte.

Further, the element such as Ni in the crystal is replaced with a Cu element, so that the hydrogen dissociation equilibrium pressure can be lowered and at the same time the conductivity of the alloy can be improved to make the alloy usable for high current electric discharge.

In the hydrogen absorbing alloy according to the second embodiment, the content of a Cu element is 1 to 8 mol % and more preferably 2 to 7 mol %. If the content of a Cu element is 2 to 7 mol %, the production amount of the above-mentioned phase of the $Pr_5Co_{19}$ type crystal structure is further increased and the above-mentioned effects of the present invention can be caused particularly significantly.

If the content of Cu exceeds 8%, the production ratio of the above-mentioned phase of the $Pr_5Co_{19}$ type crystal structure may be lowered and the cycle characteristics may be deteriorated in some cases. It is supposedly attributed to that if the content of Cu exceeds 8%, the production ratio of other crystal phases (e.g. $Ce_2Ni_7$ type crystal phase, $Ce_5Ni_{19}$ type crystal phase, and $AuBe_5$ type crystal phase) inferior in corrosion resistance to an alkaline electrolyte is increased.

The hydrogen absorbing alloy according to the second embodiment of the present invention contains 15 weight % or more of the phase of the $Pr_5Co_{19}$ type crystal structure and the ratio of the phase is more preferably 25 weight % or more, furthermore preferably 40 weight %, and especially preferably in a range of 50 to 85 weight %.

As the existence ratio of the $Pr_5Co_{19}$ type crystal structure is higher, the grain boundaries with other produced phases are lessened more and accordingly the strains during expansion and shrinkage can be moderated and pulverization can be suppressed. Owing to the suppression of the pulverization, the contact surface area of the hydrogen absorbing alloy with the alkaline electrolyte can be lessened and the corrosion of the hydrogen absorbing alloy can be suppressed and accordingly, the cycle life can be improved.

The hydrogen absorbing alloy according to the second embodiment of the present invention is preferable to have a chemical composition defined by a general formula $R1_aR2_bR3_cCu_d$ (in the formula, R1 denotes one or more element(s) selected from rare earth elements including Y (yttrium); R2 denotes one or more element(s) selected from a group consisting of Mg, Ca, Sr, and Ba; R3 denotes one or more element(s) selected from a group consisting of Ni, Co, Mn, Al, Fe, Cr, Zn, Si, Sn, V, Nb, Ta, Ti, Zr, and Hf; and a, b, c, and d denote numerals satisfying $15 \leq a \leq 19$, $2 \leq b \leq 7$, $70 \leq c \leq 80$, $1 \leq d \leq 7$, and $a+b+c+d=100$, respectively).

As the rare earth elements for the R1, one or more element(s) selected from a group consisting of La, Ce, Pr, Nd, Sm, Eu, Gd, Tb, Dy, Ho, Er, Tm, Yb, Lu, Sc, and Y are used and in terms of the hydrogen dissociation equilibrium pressure, particularly one or more element(s) selected from a group consisting of La, Ce, Pr, and Nd are preferable. Especially, a Misch metal (Mm), a mixture of rare earth elements, is economical and therefore preferably used.

As the R2, one or more element(s) selected from a group consisting of Mg, Ca, Sr, and Ba are used, and in terms of the hydrogen storage capacity and the corrosion resistance, Mg is particularly preferable.

As the R3, one or more element(s) selected from a group consisting of Ni, Co, Mn, Al, Fe, Cr. Zn, Si, Sn, V, Nb, Ta, Ti, Zr, and Hf are used, and particularly one or more element(s) selected from a group consisting of Co, Mn, Al and Ni are preferably used. Use of Ni and Co provides the hydrogen absorbing alloy with excellent alkali resistance and electrode catalytic activity. Further, use of Mn and Al makes it possible to adjust the hydrogen dissociation equilibrium pressure and particularly, it is preferable to add at least one of Mn and Al at a ratio in a range of 0.3 to 0.6 mol % (in the case of adding both, the total amount).

Examples of the specific chemical composition of the hydrogen absorbing alloy of the present invention may include $La_aMg_b(NiMn)_cCu_d$, $La_aMg_b(NiAl)_cCu_d$, and the like.

Herein, a, b, c, and d are the numerals same as those in the above-mentioned general formula.

The hydrogen absorbing alloy of the second embodiment of the present invention is preferable to have a particle size of the primary grains in a range from 10 to 100 nm.

Control of the particle size of the primary grains in the range of 10 to 100 nm causes the following effects: (1) since the phase of the $Pr_5Co_{19}$ type crystal structure is evenly dispersed in grain boundaries of other crystal phases such as a phase of the $Ce_2Ni_7$ type crystal structure, the volume change along with the hydrogen absorption can efficiently be moderated and pulverization can be prevented and accordingly the corrosion resistance is remarkably improved and (2) the phase change along with heat treatment is easily caused and the alloy phase of the present invention can be obtained at high efficiency. If the crystal particle size is smaller than 10 nm, oxidation tends to be caused easily and if it exceeds 100 nm, pulverization tends to occur easily.

To control the particle size of the primary grains within the above-mentioned range, a method involving quenching melted materials at a cooling speed of 100000K/second or more by a melt spinning method and annealing the materials under conditions described later can preferably be employed.

In this connection, the phrase that the particle size of the primary grains is in a range of 10 to 100 nm means that almost all of the primary grains are contained in a range of 10 nm at minimum and 100 nm at maximum. More specifically, it means that, in the case the particle size is measured for arbitrary 100 grains in an electron microscopic photograph, the ratio of the grains having the particle size in a range of 10 to 100 nm is 80% or more on the basis of the surface area. Further, primary grains mean grains having the single crystal structure composed of a single crystallite (also called as crystal grains). The particle size of each primary grain can be measured by using a transmission electron microscope. Specifically, a transmission electron microscope (Hitachi H9000) is used for measuring the longest length of the long side and the shortest length of the short side of each crystal grain and the particle size of the primary grain is calculated according to the following equation.

Particle size of primary grain=(long side+short side)/2

The hydrogen absorbing alloy of the second embodiment of the present invention can be obtained by mixing alloy materials in proper amounts to give the above-mentioned chemical composition defined by the general formula, heating and melting the materials, quenching and solidifying the melt at a cooling speed of 1000 K/second or more, and thereafter annealing the obtained coarse product in a temperature range of 860 to 980° C., preferably in a temperature range of 920 to 970° C. under an inert gas atmosphere in a pressurized state.

More specifically, first, prescribed amounts of raw material ingots (alloy materials) are weighed in accordance with the composition of an intended hydrogen absorbing alloy and the raw material ingots are put in a crucible and heated to 1200 to 1600° C. using a high frequency melting furnace in an inert gas atmosphere or vacuum to melt the materials. Thereafter, the melted materials are cooled for solidification.

The cooling speed at the time of cooling the melted materials is preferably 1000 K/second or more (also called as quenching). Although a stable phase such as a $CaCu_5$ type crystal structure tends to be formed easily in the case the cooling speed is lower than 1000 K/second, it is made easy to produce the $Pr_5Co_{19}$ phase, which is a metastable phase, by quenching at 1000 K/second or more. In terms of this point, the cooling method used is preferably a melt spinning method capable of cooling at a cooling speed of 100,000 K/second or higher and a gas atomizing method capable of cooling at a cooling speed of about 10,000 K/second.

Next, after solidification of the alloy, heat treatment (annealing) is carried out using an electric furnace in an inert gas atmosphere. Specifically, recrystallization annealing is carried out at a heat treatment temperature in a range of 860 to 980° C. for 3 to 50 hours under an inert gas atmosphere in a pressurized state of 0.2 to 1.0 MPa (gauge pressure).

After the cooling solidification, the alloy contains a mixed phase of the $Pr_5Co_{19}$ type crystal structure phase, which is a metastable phase, and a stable phase, however, the above-mentioned heat treatment can remarkably increase the existence ratio of the $Pr_5Co_{19}$ type crystal structure phase.

Conventionally, homogenization treatment has been carried out by heat treatment at 1000 to 1100° C. in vacuum; however, it is probable that the heat treatment under such a condition easily volatilizes Mg and may cause crystal structure change. In the present invention, the temperature condition at the time of heat treatment is set preferably to 860 to 980° C. and the pressure condition at the time of the heat treatment is set preferably to 0.2 to 1.0 MPa (gauge pressure). Further, the atmosphere used at the time of heat treatment is controlled preferably to be an inert atmosphere of argon or helium and particularly preferably a helium gas is used. If the heat treatment is carried out under such conditions, the $Pr_5Co_{19}$ phase can be obtained at high efficiency.

The heat treatment atmosphere is set to be an inert gas atmosphere (e.g. argon or helium) because oxidation of materials is prevented during the heat treatment. Further, the heat treatment temperature is 860 to 980° C. and particularly preferably 920 to 970° C. If the heat treatment temperature is within the range of 920 to 970° C., the ratio of the $Pr_5Co_{19}$ type crystal structure phase is remarkably increased and the $Pr_5Co_{19}$ type crystal structure phase becomes a main phase (the phase which occupies the largest part in the alloy).

The hydrogen absorbing alloy electrode of the second embodiment of the present invention is provided with the above-mentioned hydrogen absorbing alloy as a hydrogen storage medium. In the case of using the hydrogen absorbing alloy according to the second embodiment of the present invention as a hydrogen storage medium for an electrode, the hydrogen absorbing alloy is preferably used after being ground.

Grinding of the hydrogen absorbing alloy at the time of producing an electrode may be carried out either before or after the heat treatment, however since the surface area is increased by the grinding, it is desirable to carry out the grinding after the heat treatment in terms of prevention of oxidation of the alloy surface. The grinding is preferably carried out in an inert atmosphere for preventing oxidation of the alloy surface.

For the grinding, for example, mechanical pulverization or hydrogenation pulverization may be employed.

The secondary battery according to the present invention uses the hydrogen absorbing alloy electrode as a negative electrode and is assembled as a nickel-hydrogen storage battery, for example. The hydrogen absorbing alloy, that is, the hydrogen absorbing alloy electrode of the present invention has corrosion resistance to a strongly alkaline aqueous solution to be used as an electrolyte for a nickel-hydrogen storage battery or the like, so that the hydrogen absorbing alloy electrode is excellent in the cycle characteristics of repeating absorption and release of hydrogen.

A nickel electrode (sintered type or non-sintered type) may be used as a positive electrode for the secondary battery.

EXAMPLES

Hereinafter, the present invention will be described more specifically with reference to Examples and Comparative Examples, however it is not intended that the present invention be limited to the following Examples. The various kinds of characteristics were measured by the following methods.
(Measurement Method of Crystal Grain (Primary Grain) Size)

The crystal grain (primary grain) size was measured using a transmission electron microscope (Hitachi H9000).

The crystal grain size was measured by measuring the longest length of the long side and the shortest length of the short side of each crystal grain for arbitrary 100 pieces using a transmission electron microscope and calculated according to the following equation.

Crystal grain size=(long side+short side)/2

(Measurement Method of Average Particle Size)

The average particle size and particle size distribution of the hydrogen absorbing alloys were measured by a laser diffraction/scattering method using a particle size analyzer (product number: MT3000, manufactured by MicroTrack Co., Ltd.).

In this connection, the average particle size means a progressive average diameter D50, that is, the particle size at 50% point of the cumulative curve formed by setting the entire volume of the powder to be 100%.

(Measurement of Crystal Structure and Measurement of Existence Ratio)

Each obtained hydrogen absorbing alloy was pulverized to obtain a powder with an average particle size (D50) of 20 μm and using an x-ray diffraction apparatus (product number: M06XCE, manufactured by Bruker AXS) and in conditions of 40 kV and 100 mA (Cu tube), the measurement was carried out for the powder. Analysis was carried out by a Rietveld method (analysis software: RIETAN 2000) as structure analysis.

(Measurement of Discharge Capacity)

[Production of Electrode]

After 3 parts by weight of a nickel powder (#210, manufactured by INCO) was added and mixed to 100 parts by weight of an alloy powder, the mixture was further mixed with an aqueous solution containing a thickener (methyl cellulose) dissolved therein and also 1.5 parts by weight of a binder (styrene-butadiene rubber) to produce a paste, and the paste was applied to both faces of a perforated steel plate with a thickness of 45 μm (porosity: 60%) and dried and the resulting steel plate was pressed to a thickness of 0.36 mm to obtain a negative electrode. On the other hand, as a positive electrode, a sintered type nickel hydroxide electrode with an excess capacity was employed.

[Production of Opened Type Battery]

The negative electrode was sandwiched between the positive electrodes with a separator interposed therebetween and fixed by acrylic plates in a manner that a pressure of 10 kgf/cm$^2$ could be applied to these electrodes to assemble an opened type cell.

As an electrolyte was employed a mixed solution containing 6.8 mol/L of a KOH solution and 0.8 mol/L of an LiOH solution.

[Measurement of Discharge Capacity]

Each produced battery was put in a water bath at 20° C. and 10 cycles of charging and discharging were carried out in the following conditions: charging to 150% of the capacity at 0.1 ItA; discharging to the final voltage of −0.6 V (vs. Hg/HgO) at 0.2 ItA and when the capacity became the maximum, the discharge capacity was measured.

(Measurement of Charging and Discharging Cycle Characteristics)

Using each opened type battery produced in the above-mentioned
manner, in a water bath at 20° C. 10 cycles of charging and discharging were repeated in the following conditions: charging to 150% of the capacity at 0.1 ItA; discharging to the final voltage of −0.6 V (vs. Hg/HgO) at 0.2 ItA.

At the 11th cycle, charging and discharging were carried out in conditions of charging to 150% at 0.1 ItA and discharging to the final voltage of −0.6 V (vs. Hg/HgO) at 1 ItA: and at the 12th cycle, charging and discharging were carried out in conditions of charging to 150% at 0.1 ItA and discharging to the final voltage of −0.6 V (vs. Hg/HgO) at 3 ItA.

From the 13th cycle to 52nd cycle, charging and discharging were carried out in conditions of charging to 75% at 1 ItA and discharging to the final voltage of −0.6 V (vs Hg/HgO) at 0.5 ItA.

From the 53rd cycle to 55th cycle, charging and discharging were carried out in conditions of charging to 150% at 0.1 ItA and discharging to the final voltage of −0.6 V (vs Hg/HgO) at 0.2 ItA.

[Method for Measuring Cycle Deterioration Ratio]

The cycle deterioration ratio was measured according to the following equation: Cycle deterioration ratio=(capacity at 53th cycle/capacity at 10th cycle)×100.

(Method for Measuring Corrosion Resistance)

Each negative electrode was washed with water and dried after the charging and discharging test and the saturated magnetization per mass and the specific surface area were measured.

[Method for Measuring Saturated Magnetization per Mass]

The saturated magnetization per mass was measured using a vibrating sample magnetometer (VSM) (model name: BHV-10H, manufactured by Riken Denshi).

The saturated magnetization per mass of each hydrogen absorbing alloy before the charging and discharging test was 0.2 Am$^2$/kg or lower and along with progress of corrosion, the value of the saturated magnetization per mass becomes higher.

(Measurement of Specific Surface Area)

The specific surface area was measured by a BET method (model name: direct-reading type full automatic surface area measurement apparatus Monosorb MS-19, manufactured by QUANTACHROME).

The specific surface area of the hydrogen absorbing alloy before the charging and discharging test was 0.1 m$^2$/g or lower and along with progress of corrosion, the specific surface area becomes larger.

Example 1

In accordance with an intended composition, prescribed amounts of raw material ingots were weighed and put in a crucible and heated to 1500° C. using a high frequency melting furnace in a helium gas atmosphere at reduced pressure to melt the materials. After the melting, the melted alloy was solidified by a die casting method involving leaving the alloy in a die in the furnace.

Next, the obtained alloy was heat-treated at atmospheric pressure in a helium gas atmosphere using an electric furnace. While the temperature in the electric furnace is at 940° C., recrystallization annealing was carried out for 7 hours, and successively, the alloy was spontaneously cooled in the furnace to obtain a hydrogen absorbing alloy with a composition of $La_{16.9}Mg_{4.1}Ni_{71.1}Co_{5.8}Mn_{1.0}Al_{1.1}$.

Pulverization of the hydrogen absorbing alloy was carried out mechanically in a helium gas atmosphere to adjust the average particle size to D50=60 μm. The particle size distribution width was as follows: D10=16 μm and D90=125 μm.

The crystal structure and the existence ratio (weight %) of the obtained hydrogen absorbing alloy were measured. Further, using the obtained hydrogen absorbing alloy, the discharge capacity at 10th cycle, the discharge capacity at 12th cycle, the cycle deterioration ratio, the saturated magnetization per mass after the cycle test, and the specific surface area after the cycle test were measured.

Example 2

A hydrogen absorbing alloy with a composition of $La_{16.9}Mg_{4.1}Ni_{71.1}Co_{5.8}Mn_{1.0}Al_{1.1}$ was obtained by carrying out the same operation as that of Example 1, except that prescribed amounts of raw material ingots were weighed in accordance with the intended composition and recrystallization annealing was carried out at an annealing temperature of 940° C. under 0.2 MPa for an annealing time of 7 hours.

The obtained hydrogen absorbing alloy was subjected to the same measurements as those carried out in Example 1.

Example 3

In accordance with an intended composition, prescribed amounts of raw material ingots were weighed and put in a crucible and heated to 1500° C. using a high frequency melting furnace in a helium gas atmosphere at reduced pressure to melt the materials. After the melting, the melted alloy was solidified by quenching at 100,000 K/second or more by a melt spinning method.

Next, the obtained alloy was recrystallization-annealed at a temperature of 860° C. under 0.2 MPa in a helium gas atmosphere using an electric furnace for 7 hours and successively, the alloy was spontaneously cooled in the furnace to obtain a hydrogen absorbing alloy with a composition of $La_{16.9}Mg_{4.1}Ni_{71.1}Co_{5.8}Mn_{1.0}Al_{1.1}$. The obtained hydrogen absorbing alloy was subjected to the same measurements as those carried out in Example 1.

Example 4

A hydrogen absorbing alloy with a composition of $La_{16.9}Mg_{4.1}Ni_{71.1}Cu_{5.8}Mn_{1.0}Al_{1.1}$ was obtained by carrying out the same operation as that of Example 3, except that prescribed amounts of raw material ingots were weighed in accordance with the intended composition and recrystallization annealing was carried out at an annealing temperature of 900° C. under 0.2 MPa for 7 an annealing time of hours. The same measurements as those carried out in Example 1 were carried out for the obtained hydrogen absorbing alloy.

Example 5

A hydrogen absorbing alloy with a composition of $La_{16.9}Mg_{4.1}Ni_{71.1}Co_{5.8}Mn_{1.0}Al_{1.1}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours. The same measurements as those carried out in Example 1 were carried out for the obtained hydrogen absorbing alloy.

Example 6

A hydrogen absorbing alloy with a composition of $La_{16.9}Mg_{4.1}Ni_{71.1}Co_{5.8}Mn_{1.0}Al_{1.1}$ was obtained by carrying out the same operation as that of Example 3, except that prescribed amounts of raw material ingots were weighed in accordance with the intended composition and recrystallization annealing was carried out at an annealing temperature of 980° C. under 0.2 MPa for an annealing time of 7 hours. The same measurements as those carried out in Example 1 were carried out for the obtained hydrogen absorbing alloy.

Example 7

A hydrogen absorbing alloy with a composition of $La_{16.9}Mg_{4.1}Ni_{71.1}Co_{5.8}Mn_{1.0}Al_{1.1}$ was obtained by carrying out the same operation as that of Example 3, except that prescribed amounts of raw material ingots were weighed in accordance with the intended composition and recrystallization annealing was carried out at an annealing temperature of 1020° C. under 0.2 MPa for an annealing time of 7 hours.

The same measurements as those carried out in Example 1 were carried out for the obtained hydrogen absorbing alloy.

Example 8

A hydrogen absorbing alloy with a composition of $La_{16.9}Mg_{4.1}Ni_{71.1}Co_{5.8}Mn_{1.0}Al_{1.1}$ was obtained by carrying out the same operation as that of Example 3, except that prescribed amounts of raw material ingots were weighed in accordance with the intended composition and recrystallization annealing was carried out at an annealing temperature of 940° C. under 0.5 MPa for an annealing time of 7 hours.

The same measurements as those carried out in Example 1 were carried out for the obtained hydrogen absorbing alloy.

Example 9

A hydrogen absorbing alloy with a composition of $La_{16.9}Mg_{4.1}Ni_{71.1}Co_{5.8}Mn_{1.0}Al_{1.1}$ was obtained by carrying out the same operation as that of Example 3, except that prescribed amounts of raw material ingots were weighed in accordance with the intended composition and recrystallization annealing was carried out at an annealing temperature of 940° C. in a helium atmosphere under atmospheric pressure for an annealing time of 7 hours.

The same measurements as those carried out in Example 1 were carried out for the obtained hydrogen absorbing alloy.

Example 10

A hydrogen absorbing alloy with a composition of $La_{16.9}Mg_{4.1}Ni_{69.2}Co_{6.0}Mn_{1.9}Al_{1.9}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 11

A hydrogen absorbing alloy with a composition of $La_{17.0}Mg_{4.2}Ni_{77.0}Mn_{1.8}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for 7 an annealing time of hours.

The same measurements as those carried out in Example 1 were carried out for the obtained hydrogen absorbing alloy.

Example 12

A hydrogen absorbing alloy with a composition of $La_{17.2}Mg_{4.0}Ni_{73.3}Co_{3.9}Mn_{1.6}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 13

A hydrogen absorbing alloy with a composition of $La_{12.8}Pr_{4.0}Mg_{3.6}Ni_{72.1}Co_{4.4}Mn_{3.1}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 14

A hydrogen absorbing alloy with a composition of $La_{13.4}Ce_{4.2}Mg_{3.6}Ni_{71.1}Co_{4.0}Mn_{3.7}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 15

A hydrogen absorbing alloy with a composition of $La_{13.9}Ce_{2.1}Nd_{0.8}Mg_{4.1}Ni_{72.2}Co_{4.0}Mn_{2.9}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 16

A hydrogen absorbing alloy with a composition of $La_{14.1}Ce_{2.0}Nd_{0.9}Mg_{4.1}Ni_{76.3}Mn_{2.6}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy. The results are shown in Table 1.

Example 17

A hydrogen absorbing alloy with a composition of $La_{17.6}Mg_{3.6}Ni_{76.4}Mn_{1.4}Al_{1.0}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 18

A hydrogen absorbing alloy with a composition of $La_{17.8}Mg_{3.4}Ni_{68.2}Co_{6.4}Mn_{2.1}Al_{2.1}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 19

A hydrogen absorbing alloy with a composition of $La_{16.3}Mg_{4.7}Ni_{69.9}Co_{6.0}Mn_{2.0}Al_{1.1}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 20

A hydrogen absorbing alloy with a composition of $La_{15.8}Mg_{5.0}Ni_{71.1}Co_{4.1}Mn_{2.0}Al_{2.0}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 21

A hydrogen absorbing alloy with a composition of $La_{17.0}Mg_{4.1}Ni_{73.9}Mn_{0.9}Al_{4.1}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Example 22

A hydrogen absorbing alloy with a composition of $La_{17.0}Mg_{4.1}Ni_{73.7}Co_{4.7}Mn_{0.2}Al_{0.3}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Comparative Example 1

A hydrogen absorbing alloy with a composition of $La_{13.1}Ce_{1.8}Nd_{1.1}Ni_{64.1}Co_{9.9}Mn_{5.0}Al_{5.0}$ was obtained by carrying out the same operation as that of Example 2, except that prescribed amounts of raw material ingots were weighed in accordance with the intended composition and recrystallization annealing was carried out at an annealing temperature of 100° C. for an annealing time of 7 hours.

The same measurements as those carried out in Example 1 were carried out for the obtained hydrogen absorbing alloy.

Comparative Example 2

A hydrogen absorbing alloy with a composition of $La_{17.1}Mg_{8.0}Ni_{62.2}Co_{12.7}$ was obtained by carrying out the same operation as that of Example 2, except that prescribed amounts of raw material ingots were weighed in accordance with the intended composition and recrystallization annealing was carried out at an annealing temperature of 1000° C. for an annealing time of 7 hours.

The same measurements as those carried out in Example 1 were carried out for the obtained hydrogen absorbing alloy.

Comparative Example 3

In accordance with an intended composition, prescribed amounts of raw material ingots were weighed, put in a crucible and heated to 1500° C. using a high frequency melting furnace in a helium gas atmosphere at reduced pressure to melt the materials.

After the melting, the melted alloy was solidified by a die casting method involving leaving the alloy in a die in the furnace to obtain a hydrogen absorbing alloy with a composition of $La_{16.9}Mg_{4.1}Ni_{71.1}Co_{5.8}Mn_{1.0}Al_{1.1}$.

No recrystallization annealing was carried out for the obtained hydrogen absorbing alloy. The same measurements as those carried out in Example 1 were carried out for the obtained hydrogen absorbing alloy.

Comparative Example 4

A hydrogen absorbing alloy with a composition of $La_{18.2}Mg_{3.0}Ni_{68.3}Co_{6.3}Mn_{2.1}Al_{2.1}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Comparative Example 5

A hydrogen absorbing alloy with a composition of $La_{14.5}Mg_{6.5}Ni_{69.4}Co_{5.9}Mn_{1.9}Al_{1.8}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Comparative Example 6

A hydrogen absorbing alloy with a composition of $La_{17.8}Mg_{4.3}Ni_{75.6}Mn_{2.3}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Comparative Example 7

A hydrogen absorbing alloy with a composition of $La_{16.4}Mg_{3.6}Ni_{78.5}Mn_{1.5}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Comparative Example 8

A hydrogen absorbing alloy with a composition of $La_{16.9}Mg_{4.0}Ni_{72.2}Mn_{1.9}Al_{5.0}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

Comparative Example 9

A hydrogen absorbing alloy with a composition of $La_{16.9}Mg_{4.0}Ni_{74.8}Co_{4.1}Al_{0.2}$ was obtained by carrying out the same operation as that of Example 3, except that prescribed amounts of raw material ingots were weighed in accordance with the intended composition and recrystallization annealing was carried out at an annealing temperature of 940° C. under 0.2 MPa for an annealing time of 7 hours.

The same measurements as those carried out in Example 1 were carried out for the obtained hydrogen absorbing alloy.

The production conditions and measurement results for the above-mentioned Examples and Comparative Examples are shown in the following Tables 1 to 4.

TABLE 1

|  |  | Example 1 | Example 2 | Example 3 | Example 4 | Example 5 | Example 6 | Example 7 | Example 8 |
|---|---|---|---|---|---|---|---|---|---|
| Composition | | B | B | B | B | B | B | B | B |
| Production method | | die casting | die casting | melt spinning | melt spinning | melt spinning | melt spinning | melt spinning | melt spinning |
| Heat treatment pressure condition (MPa) | | Atmospheric pressure | 0.2 | 0.2 | 0.2 | 0.2 | 0.2 | 0.2 | 0.5 |
| Heat treatment temperature and time | | 940° C. 7 hr | 940° C. 7 hr | 860° C. 7 hr | 900° C. 7 hr | 940° C. 7 hr | 980° C. 7 hr | 1020° C. 7 hr | 940° C. 7 hr |
| Rietveld analysis | Rwp | 3.76 | 3.70 | 3.52 | 3.25 | 3.35 | 3.33 | 4.06 | 3.50 |
| | Re | 1.87 | 1.90 | 1.80 | 1.85 | 2.01 | 2.05 | 1.99 | 2.01 |
| | S | 2.01 | 1.95 | 1.96 | 1.76 | 1.67 | 1.62 | 2.04 | 1.74 |

TABLE 1-continued

|  |  | Example 1 | Example 2 | Example 3 | Example 4 | Example 5 | Example 6 | Example 7 | Example 8 |
|---|---|---|---|---|---|---|---|---|---|
| Crystal structure (weight %) | AB5(CaCu5) | 5 | 18 | 17 | 22 | 13 | 17 | 38 | 5 |
|  | A5B19(Ce5Co19) | 20 | 30 | 56 | 10 | 0 | 0 | 14 | 0 |
|  | A2B7(Ce2Ni7)(Gd2Co7) | 34 | 10 | 22 | 24 | 5 | 4 | 36 | 5 |
|  | AB3(PuNi3) | 0 | 0 | 0 | 0 | 0 | 0 | 0 | 0 |
|  | A5B19(Pr5Co19) | 39 | 42 | 5 | 44 | 82 | 79 | 12 | 90 |
|  | AB2(AuBe5) | 2 | 0 | 0 | 0 | 0 | 0 | 2 | 0 |
| Discharge capacity at 10th cycle (0.2 ItA discharge) (mAh/g) |  | 351 | 340 | 345 | 351 | 346 | 343 | 325 | 347 |
| Cycle deterioration ratio (53rd/10th) (%) |  | 93.1 | 94 | 95.4 | 96.8 | 98.1 | 98.4 | 94.5 | 98.4 |
| Saturated magnetization per mass after cycle test ($Am^2$/kg) |  | 4.22 | 3.9 | 3.52 | 3.46 | 3.1 | 2.95 | 3.55 | 2.55 |
| Specific surface area after cycle test $m^2$/g) |  | 3.75 | 3.41 | 2.26 | 2.22 | 2.05 | 2.01 | 2.61 | 1.94 |

TABLE 2

|  |  | Example 9 | Example 10 | Example 11 | Example 12 | Example 13 | Example 14 | Example 15 | Example 16 |
|---|---|---|---|---|---|---|---|---|---|
| Composition |  | B | A | C | D | E | F | G | H |
| Production method |  | melt spinning | melt spinning | melt spinning | melt spinning | melt spinning | melt spinning | melt spinning | melt spinning |
| Heat treatment pressure condition (MPa) |  | Atmospheric pressure | 0.2 | 0.2 | 0.2 | 0.2 | 0.2 | 0.2 | 0.2 |
| Heat treatment temperature and time |  | 940° C. 7 hr | 940° C. 7 hr | 940° C. 7 hr | 940° C. 7 hr | 940° C. 7 hr | 940° C. 7 hr | 940° C. 7 hr | 940° C. 7 hr |
| Rietveld analysis | Rwp | 3.65 | 3.24 | 3.55 | 4.22 | 3.99 | 3.45 | 3.77 | 3.35 |
|  | Re | 1.88 | 1.88 | 1.90 | 2.01 | 2.11 | 1.97 | 1.96 | 1.97 |
|  | S | 1.94 | 1.72 | 1.87 | 2.10 | 1.89 | 1.75 | 1.92 | 1.70 |
| Crystal structure (weight %) | AB5(CaCu5) | 15 | 16 | 20 | 22 | 21 | 20 | 23 | 21 |
|  | A5B19(Ce5Co19) | 5 | 0 | 4 | 4 | 4 | 10 | 6 | 5 |
|  | A2B7(Ce2Ni7)(Gd2Co7) | 10 | 7 | 9 | 9 | 5 | 15 | 13 | 14 |
|  | AB3(PuNi3) | 0 | 0 | 0 | 0 | 0 | 0 | 0 | 0 |
|  | A5B19(Pr5Co19) | 70 | 77 | 67 | 65 | 70 | 55 | 58 | 60 |
|  | AB2(AuBe5) | 0 | 0 | 0 | 0 | 0 | 0 | 0 | 0 |
| Discharge capacity at 10th cycle (0.2 ItA discharge) (mAh/g) |  | 346 | 340 | 337 | 336 | 335 | 337 | 332 | 335 |
| Cycle deterioration ratio (53rd/10th) (%) |  | 96 | 97.3 | 96.5 | 96.4 | 96.7 | 95.5 | 96.2 | 96.4 |
| Saturated magnetization per mass after cycle test ($Am^2$/kg) |  | 3.5 | 3.31 | 2.76 | 3.44 | 3.5 | 3.55 | 3.4 | 2.89 |
| Specific surface area after cycle test ($m^2$/g) |  | 2.25 | 2.21 | 2.31 | 2.33 | 2.39 | 2.44 | 2.3 | 2.22 |

TABLE 3

|  |  | Example 17 | Example 18 | Example 19 | Example 20 | Example 21 | Example 22 | Comparative Example 1 | Comparative Example 2 |
|---|---|---|---|---|---|---|---|---|---|
| Composition |  | I | M | N | O | T | U | J | K |
| Production method |  | melt spinning | melt spinning | melt spinning | melt spinning | melt spinning | melt spinning | die casting | die casting |
| Heat treatment pressure condition (MPa) |  | 0.2 | 0.2 | 0.2 | 0.2 | 0.2 | 0.2 | 0.2 | 0.2 |
| Heat treatment temperature and time |  | 940° C. 7 hr | 940° C. 7 hr | 940° C. 7 hr | 940° C. 7 hr | 940° C. 7 hr | 940° C. 7 hr | 1000° C. 7 hr | 1000° C. 7 hr |
| Rietveld analysis | Rwp | 3.69 | 4.12 | 3.87 | 4.01 | 3.54 | 3.46 | 3.04 | 4.59 |
|  | Re | 1.87 | 2.08 | 1.98 | 2.11 | 2.11 | 2.05 | 1.81 | 2.12 |
|  | S | 1.97 | 1.98 | 1.95 | 1.9 | 1.68 | 1.69 | 1.68 | 2.17 |

TABLE 3-continued

|  |  | Example 17 | Example 18 | Example 19 | Example 20 | Example 21 | Example 22 | Comparative Example 1 | Comparative Example 2 |
|---|---|---|---|---|---|---|---|---|---|
| Crystal structure (weight %) | AB5(CaCu5) | 6 | 25 | 11 | 16 | 19 | 17 | 100 | 0 |
|  | A5B19(Ce5Co19) | 0 | 26 | 21 | 14 | 15 | 14 | 0 | 18 |
|  | A2B7(Ce2Ni7)(Gd2Co7) | 19 | 38 | 17 | 37 | 46 | 43 | 0 | 70 |
|  | AB3(PuNi3) | 0 | 0 | 0 | 0 | 0 | 0 | 0 | 7 |
|  | A5B19(Pr5Co19) | 75 | 8 | 51 | 31 | 13 | 26 | 0 | 0 |
|  | AB2(AuBe5) | 0 | 3 | 0 | 2 | 7 | 0 | 0 | 5 |
| Discharge capacity at 10th cycle (0.2 ItA discharge) (mAh/g) | | 360 | 333 | 342 | 340 | 336 | 341 | 302 | 327 |
| Cycle deterioration ratio (53rd/10th) (%) | | 96.9 | 93.9 | 95.5 | 94.8 | 94.4 | 94.1 | 99.3 | 90 |
| Saturated magnetization per mass after cycle test ($Am^2/kg$) | | 2.88 | 3.75 | 3.55 | 3.71 | 3.65 | 3.6 | 2.27 | 7.21 |
| Specific surface area after cycle test ($m^2/g$) | | 2.3 | 3.11 | 2.99 | 3.01 | 3.05 | 3.11 | 0.94 | 6.95 |

TABLE 4

|  |  | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|
| Composition | | B | L | P | Q | R | S | V |
| Production method | | die casting | melt spinning | melt spinning | melt spinning | melt spinning | melt spinning | melt spinning |
| Heat treatment pressure condition (MPa) | | none | 0.2 | 0.2 | 0.2 | 0.2 | 0.2 | 0.2 |
| Heat treatment temperature and time | | none | 940° C. 7 hr | 940° C. 7 hr | 940° C. 7 hr | 940° C. 7 hr | 940° C. 7 hr | 940° C. 7 hr |
| Rietveld analysis | Rwp | 3.56 | 4.99 | 5.12 | 4.23 | 3.98 | 3.88 | 3.55 |
|  | Re | 1.91 | 2.14 | 2.11 | 2.01 | 1.99 | 1.97 | 2.05 |
|  | S | 1.86 | 2.33 | 2.43 | 2.10 | 2.00 | 1.97 | 1.73 |
| Crystal structure (weight %) | AB5(CaCu5) | 45 | 33 | 29 | 17 | 22 | 15 | 20 |
|  | A5B19(Ce5Co19) | 26 | 3 | 7 | 20 | 22 | 20 | 22 |
|  | A2B7(Ce2Ni7)(Gd2Co7) | 10 | 42 | 50 | 61 | 53 | 49 | 55 |
|  | AB3(PuNi3) | 0 | 0 | 0 | 0 | 0 | 0 | 0 |
|  | A5B19(Pr5Co19) | 0 | 0 | 0 | 2 | 3 | 0 | 3 |
|  | AB2(AuBe5) | 7 | 22 | 14 | 0 | 0 | 16 | 0 |
| Discharge capacity at 10th cycle (0.2 ItA discharge) (mAh/g) | | 315 | 319 | 316 | 344 | 339 | 327 | 339 |
| Cycle deterioration ratio (53rd/10th) (%) | | 88.2 | 92.1 | 90.1 | 92.3 | 92.3 | 91.5 | 91.4 |
| Saturated magnetization per mass after cycle test ($Am^2/kg$) | | 6.21 | 4.56 | 5.13 | 4.44 | 4.34 | 4.68 | 4.66 |
| Specific surface area after cycle test ($m^2/g$) | | 5.5 | 4.12 | 4.85 | 3.95 | 3.81 | 4.53 | 4.32 |

The compositions of the hydrogen absorbing alloys in Tables 1 to 4 are as follows.

A: $La_{16.9}Mg_{4.1}Ni_{69.2}Co_{6.0}Mn_{1.9}Al_{1.9}$,
B: $La_{16.9}Mg_{4.1}Ni_{71.1}Co_{5.8}Mn_{1.0}Al_{1.1}$,
C: $La_{17.0}Mg_{4.2}Ni_{77.0}Mn_{1.8}$,
D: $La_{17.2}Mg_{4.0}Ni_{73.3}Co_{3.9}Mn_{1.6}$,
E: $La_{12.8}Pr_{4.0}Mg_{3.6}Ni_{72.1}Co_{4.4}Mn_{3.1}$,
F: $La_{13.4}Ce_{4.2}Mg_{3.6}Ni_{71.1}Co_{4.0}Mn_{3.7}$,
G: $La_{13.9}Ce_{2.1}Nd_{0.8}Mg_{4.1}Ni_{72.2}Co_{4.0}Mn_{2.9}$,
H: $La_{14.1}Ce_{2.0}Nd_{0.9}Mg_{4.1}Ni_{76.3}Mn_{2.6}$,
I: $La_{17.6}Mg_{3.6}Ni_{76.4}Mn_{1.4}A_{1.0}$,
J: $La_{13.1}Ce_{1.8}Nd_{1.1}Ni_{64.1}Co_{9.9}Mn_{5.0}Al_{5.0}$,
K: $La_{17.1}Mg_{8.0}Ni_{62.2}Co_{12.7}$,
L: $La_{15.2}Mg_{3.0}Ni_{68.3}Co_{6.3}Mn_{2.1}Al_{2.1}$,
M: $La_{17.5}Mg_{3.4}Ni_{68.2}Cu_{6.4}Mn_{2.1}Al_{2.1}$,
N: $La_{16.3}Mg_{4.7}Ni_{69.9}Co_{6.0}Mn_{2.0}Al_{1.1}$,
O: $La_{15.8}Mg_{5.0}Ni_{71.1}Co_{4.1}Mn_{2.0}Al_{2.0}$,
P: $La_{14.5}Mg_{6.5}Ni_{69.4}Cu_{5.9}Mn_{1.9}Al_{1.8}$,
Q: $La_{17.8}Mg_{1.3}Ni_{75.6}Mn_{2.3}$,
R: $La_{16.4}Mg_{3.6}Ni_{78.5}Mn_{1.5}$,
S: $La_{16.9}Mg_{4.0}Ni_{72.2}Mn_{1.9}Al_{5.0}$,
T: $La_{17.0}Mg_{4.1}Ni_{73.9}Mn_{0.9}Al_{4.1}$,
U: $La_{17.0}Mg_{4.1}Ni_{73.7}Cu_{4.7}Mn_{0.2}Al_{0.3}$,
V: $La_{16.9}Mg_{4.0}Ni_{74.8}Co_{4.1}Al_{0.2}$

As shown in Tables 1 to 4, it was found that the hydrogen absorbing alloys obtained in Examples 1 to 22 had high capacities and were excellent in durability to the charging and discharging cycles.

Experiment Example 1

As shown in Table 5, prescribed amounts of raw material ingots having chemical compositions 1 to 5 with different Cu element contents were weighed and put in crucibles and heated to 1500° C. using a high frequency melting furnace in an argon gas atmosphere at reduced pressure to melt the materials. After the melting, the melted alloys were solidified by quenching by a melt spinning method.

Figure 3:
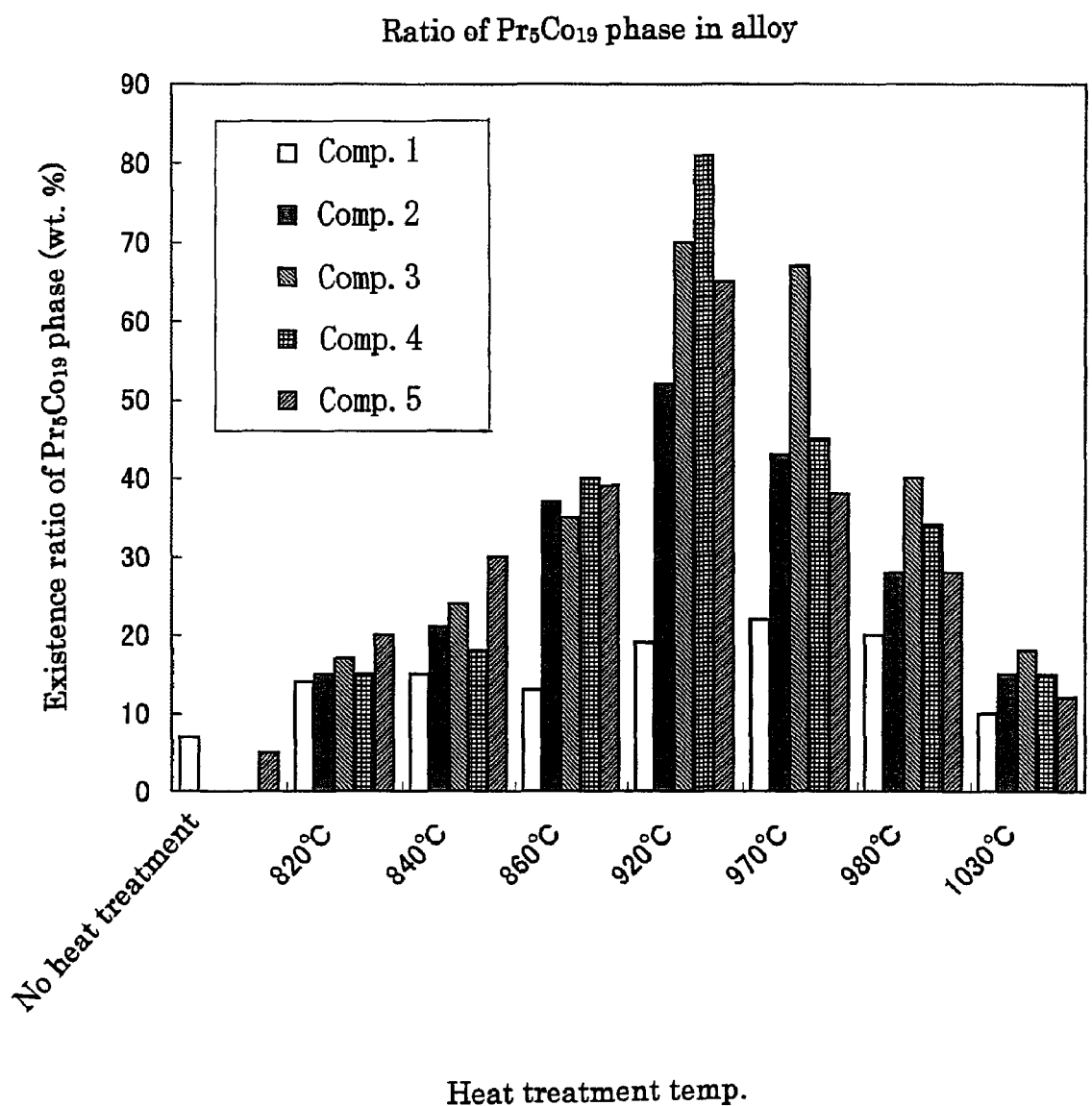
FIG. 3: A drawing showing a relation between the heat treatment temperature and the existence ratio of the Pr$_5$Co$_{19}$ type crystal structure phase.

Next, the obtained alloys were heat-treated at respective temperatures shown in Table 1 in an argon gas atmosphere pressurized to 0.2 MPa (gauge pressure, hereinafter the same). The crystal structure, existence ratio of phases, and average particle size were measured in the same manner as described above for the obtained alloys. The production ratios of the $Pr_5Co_{19}$ type crystal structure phase are shown in Table 5 and FIG. 3.

TABLE 5

Production ratio of $Pr_5Co_{19}$ type crystal structure phase (weight %)

| Chemical composition | | No heat treatment | 820° C. | 840° C. | 860° C. | 920° C. | 970° C. | 980° C. | 1030° C. |
|---|---|---|---|---|---|---|---|---|---|
| $La_{17.0}Mg_{4.3}Ni_{76.6}Mn_{2.1}$ | Composition 1 (containing no Cu) | 7 | 14 | 15 | 13 | 19 | 22 | 20 | 10 |
| $La_{17.0}Mg_{4.3}Ni_{75.5}Mn_{2.1}Cu_{1.1}$ | Composition 2 | 0 | 15 | 21 | 37 | 52 | 43 | 28 | 15 |
| $La_{17.0}Mg_{4.3}Ni_{74.5}Mn_{2.1}Cu_{2.1}$ | Composition 3 | 0 | 17 | 24 | 35 | 70 | 67 | 40 | 18 |
| $La_{17.0}Mg_{4.3}Ni_{72.3}Mn_{2.1}Cu_{4.3}$ | Composition 4 (standard) | 0 | 15 | 18 | 40 | 81 | 45 | 34 | 15 |
| $La_{17.0}Mg_{4.3}Ni_{70.2}Mn_{2.1}Cu_{6.4}$ | Composition 5 | 5 | 20 | 30 | 39 | 65 | 38 | 28 | 12 |

Figure 4:
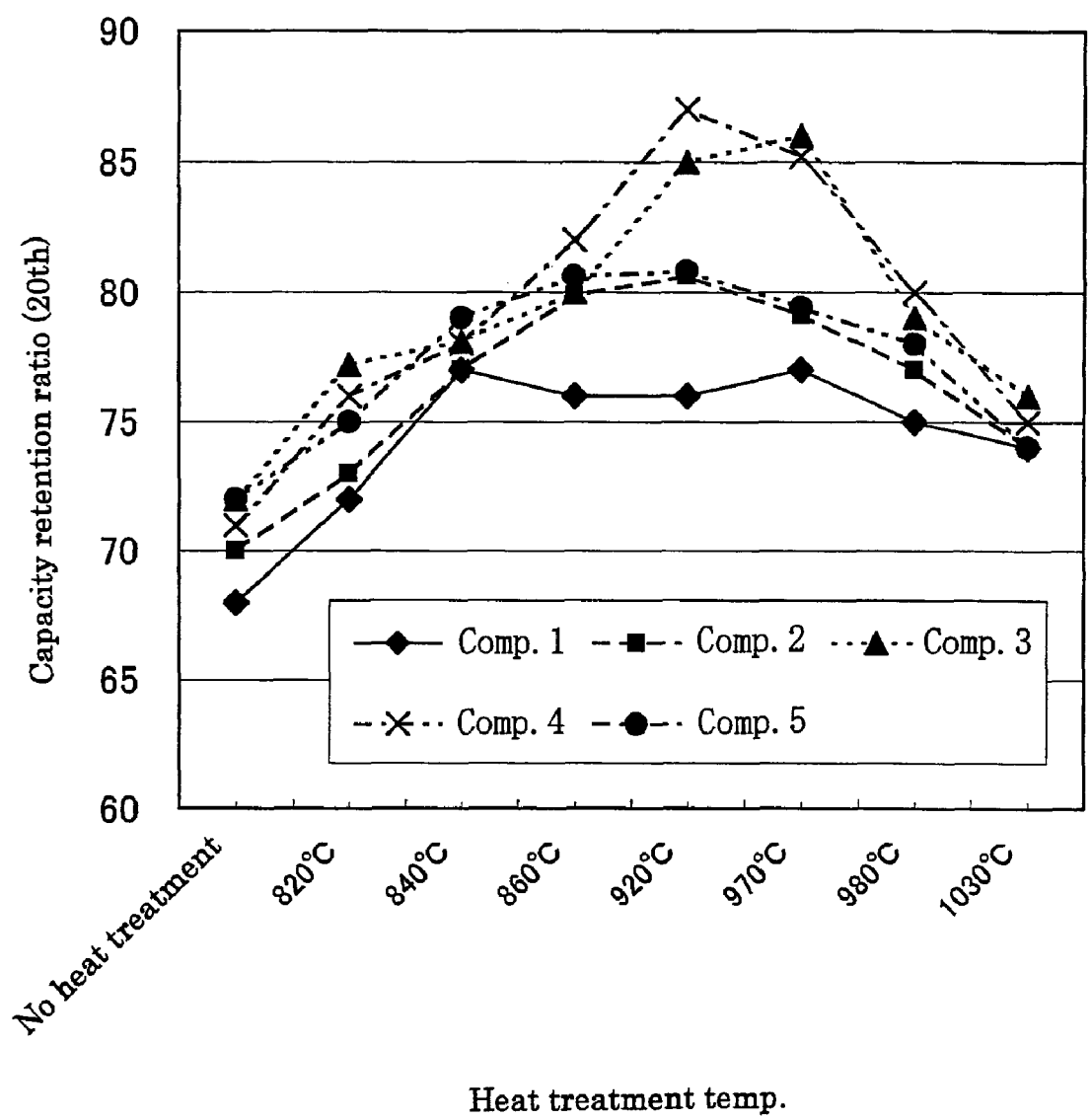
FIG. 4: A drawing showing a relation between the heat treatment temperature and the capacity retention ratio.

In the above-mentioned Experiment Example, the charging and discharging characteristics measurement was also carried out in the same manner as described above. The results are shown in Table 6 and FIG. 4.

TABLE 6

Results of capacity retention ratio (%)

| | No heat treatment | 820° C. | 840° C. | 860° C. | 920° C. | 970° C. | 980° C. | 1030° C. |
|---|---|---|---|---|---|---|---|---|
| Composition 1 | 68 | 72 | 77 | 76 | 76 | 77 | 75 | 74 |
| Composition 2 | 70 | 73 | 77 | 80 | 81 | 79 | 77 | 74 |
| Composition 3 | 72 | 77 | 78 | 80 | 85 | 86 | 79 | 76 |
| Composition 4 | 71 | 76 | 78 | 82 | 87 | 85 | 80 | 75 |
| Composition 5 | 72 | 75 | 79 | 81 | 81 | 79 | 78 | 74 |

Experiment Example 2

Figure 5:
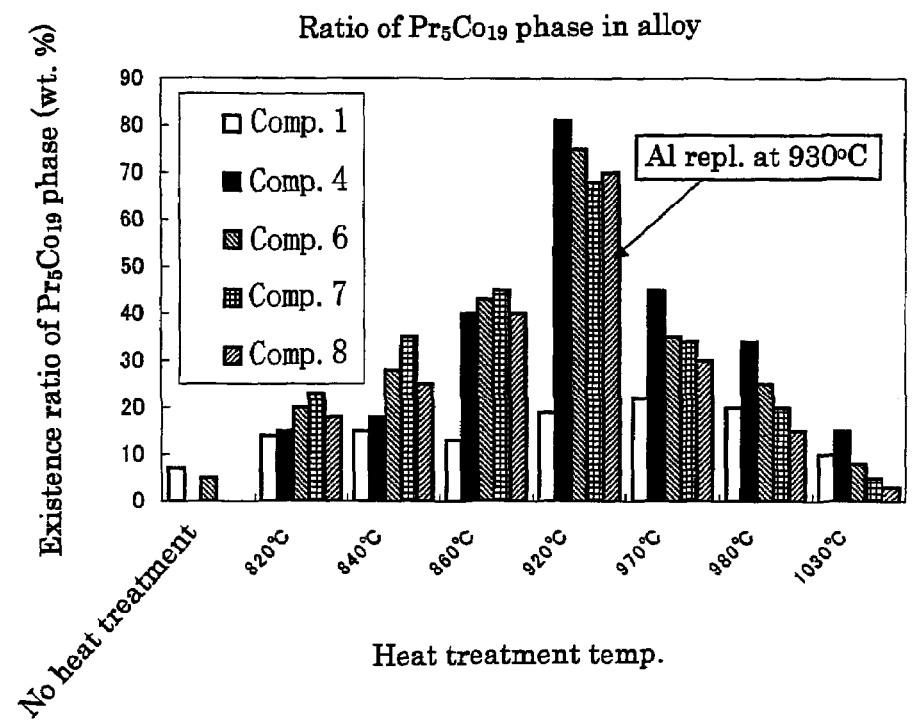
FIG. 5: A drawing showing a relation between the heat treatment temperature and the existence ratio of the Pr$_5$Co$_{19}$ type crystal structure phase.
Figure 6:
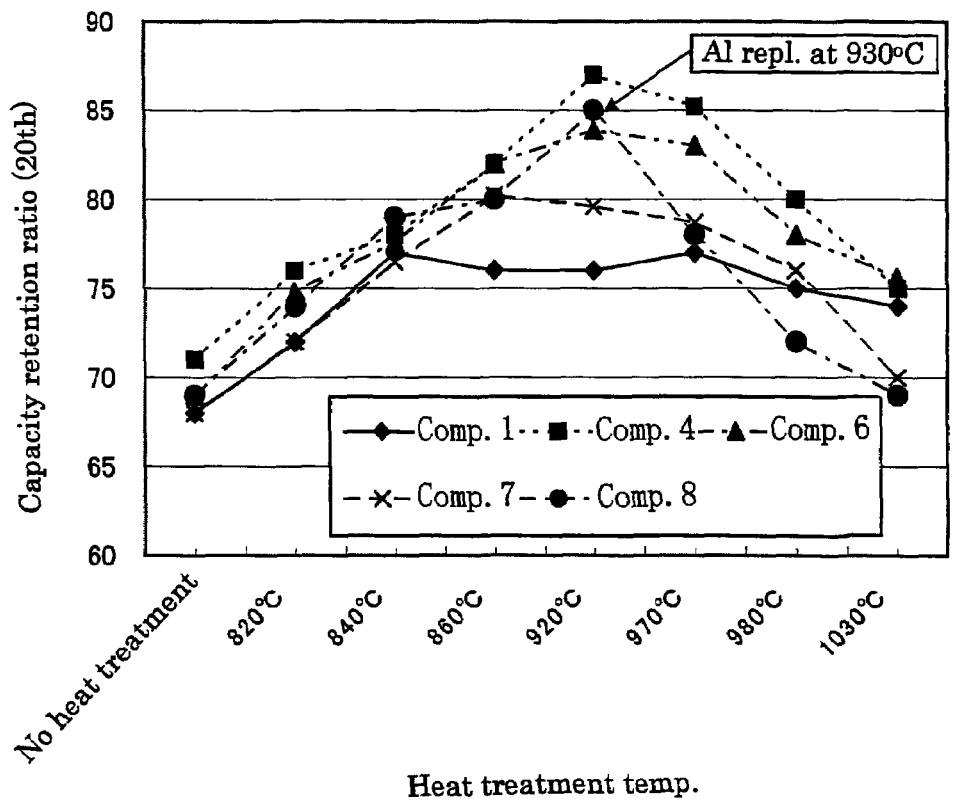
FIG. 6: A drawing showing a relation between the heat treatment temperature and the capacity retention ratio.

The respective experiments and measurements were carried out in the same manner as in Experiment Example 1, except that as shown in Table 7, raw material ingots having chemical compositions 1, 4, and 6 to 8 with different Mn element contents and containing an Al element in place of the Mn element were used. The production ratios of the phase of the $Pr_5Co_{19}$ type crystal structure are shown in Table 7 and FIG. 5 and the measurement results of the capacity retention ratios are shown in Table 8 and FIG. 6.

TABLE 7

Production ratio of $Pr_5Co_{19}$ type crystal structure phase (weight %)

| Chemical composition | | No heat treatment | 820° C. | 840° C. | 860° C. | 920° C. | 970° C. | 980° C. | 1030° C. |
|---|---|---|---|---|---|---|---|---|---|
| $La_{17.0}Mg_{4.3}Ni_{76.6}Mn_{2.1}$ | Composition 1 (containing no Cu) | 7 | 14 | 15 | 13 | 19 | 22 | 20 | 10 |
| $La_{17.0}Mg_{4.3}Ni_{72.3}Mn_{2.1}Cu_{4.3}$ | Composition 4 (standard) | 0 | 15 | 18 | 40 | 81 | 45 | 34 | 15 |
| $La_{17.0}Mg_{4.3}Ni_{70.2}Mn_{4.3}Cu_{4.3}$ | Composition 6 | 5 | 20 | 28 | 43 | 75 | 35 | 25 | 8 |
| $La_{17.0}Mg_{4.3}Ni_{68.1}Mn_{6.4}Cu_{4.3}$ | Composition 7 | 0 | 23 | 35 | 45 | 68 | 34 | 20 | 5 |
| $La_{17.0}Mg_{4.3}Ni_{70.2}Al_{4.3}Cu_{4.3}$ | Composition 8 | 0 | 18 | 25 | 40 | 70 | 30 | 15 | 3 |

TABLE 8

| | Results of capacity retention ratio (%) | | | | | | | |
|---|---|---|---|---|---|---|---|---|
| | No heat treatment | 820° C. | 840° C. | 860° C. | 920° C. | 970° C. | 980° C. | 1030° C. |
| Composition 1 (containing no Cu) | 68 | 72 | 77 | 76 | 76 | 77 | 75 | 74 |
| Composition 4 (standard) | 71 | 76 | 78 | 82 | 87 | 85 | 80 | 75 |
| Composition 6 | 69 | 75 | 78 | 82 | 84 | 83 | 78 | 76 |
| Composition 7 | 68 | 72 | 77 | 80 | 80 | 79 | 76 | 70 |
| Composition 8 | 69 | 74 | 79 | 80 | 85 | 78 | 72 | 69 |

Experiment Example 3

Figure 7:
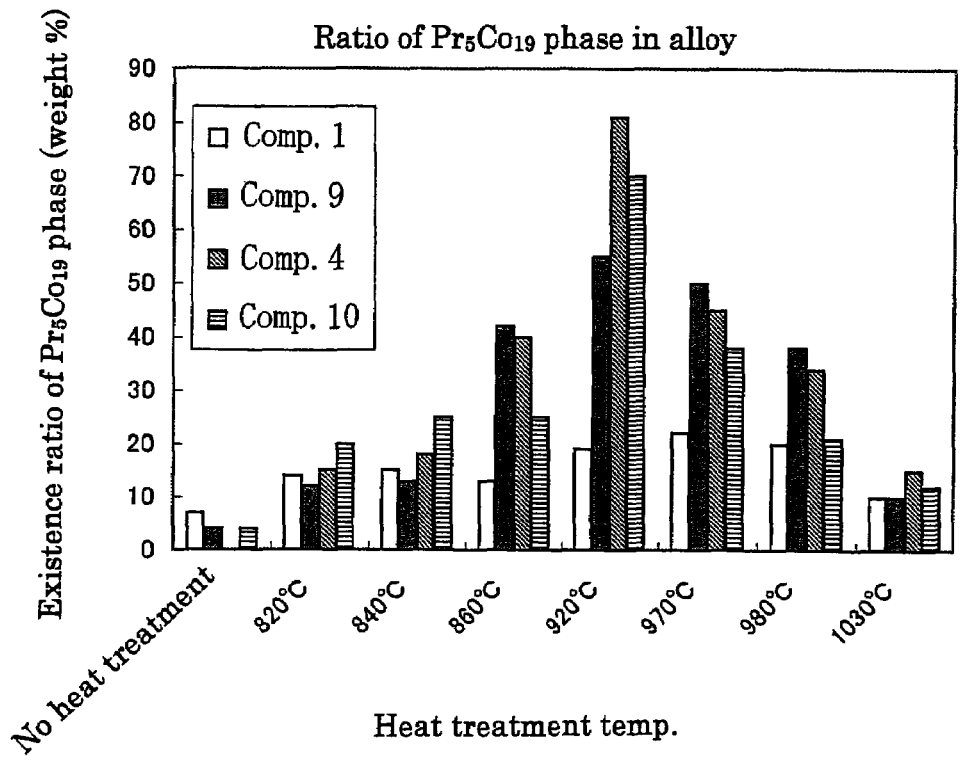
FIG. 7: A drawing showing a relation between the heat treatment temperature and the existence ratio of the Pr$_5$Co$_{19}$ type crystal structure phase.
Figure 8:
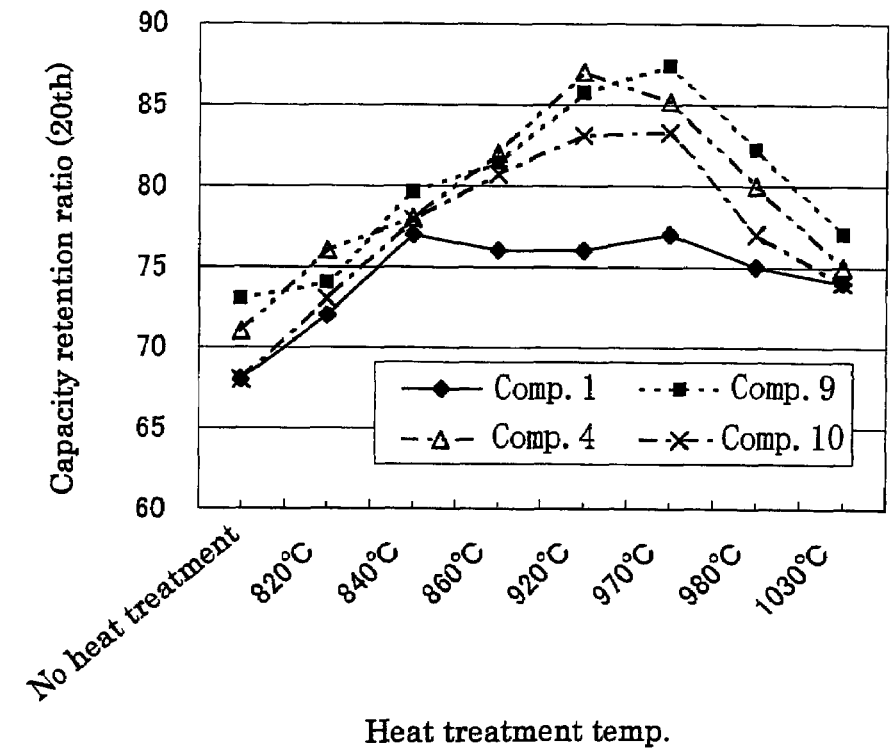
FIG. 8: A drawing showing a relation between the heat treatment temperature and the capacity retention ratio.

The respective experiments and measurements were carried out in the same manner as in Experiment Example 1, except that as shown in Table 9, raw material ingots having chemical compositions with different contents of total amounts of La and Mn elements were used. The production ratios of the phase of the $Pr_5Co_{19}$ type crystal structure are shown in Table 9 and FIG. 7 and the measurement results of the capacity retention ratios are shown in Table 10 and FIG. 8.

TABLE 9

| | | Production ratio of $Pr_5Co_{19}$ type crystal structure phase (weight %) | | | | | | | |
|---|---|---|---|---|---|---|---|---|---|
| Chemical composition | | No heat treatment | 820° C. | 840° C. | 860° C. | 920° C. | 970° C. | 980° C. | 1030° C. |
| $La_{17.0}Mg_{4.3}Ni_{76.6}Mn_{2.1}$ | Composition 1 (containing no Cu) | 7 | 14 | 15 | 13 | 19 | 22 | 20 | 10 |
| $La_{19.1}Mg_{2.1}Ni_{72.3}Mn_{2.1}Cu_{4.3}$ | Composition 9 | 4 | 12 | 13 | 42 | 55 | 50 | 38 | 10 |
| $La_{17.0}Mg_{4.3}Ni_{72.3}Mn_{2.1}Cu_{4.3}$ | Composition 4 (standard) | 0 | 15 | 18 | 40 | 81 | 45 | 34 | 15 |
| $La_{14.9}Mg_{6.4}Ni_{72.3}Mn_{2.1}Cu_{4.3}$ | Composition 10 | 4 | 20 | 25 | 25 | 70 | 38 | 21 | 12 |

TABLE 10

| | Results of capacity retention ratio (%) | | | | | | | |
|---|---|---|---|---|---|---|---|---|
| | No heat treatment | 820° C. | 840° C. | 860° C. | 920° C. | 970° C. | 980° C. | 1030° C. |
| Composition 1 (containing no Cu) | 68 | 72 | 77 | 76 | 76 | 77 | 75 | 74 |
| Composition 9 | 73 | 74 | 80 | 81 | 86 | 87 | 82 | 77 |
| Composition 4 (standard) | 71 | 76 | 78 | 82 | 87 | 85 | 80 | 75 |
| Composition 10 | 68 | 73 | 78 | 81 | 83 | 83 | 77 | 74 |

Experiment Example 4

Figure 9:
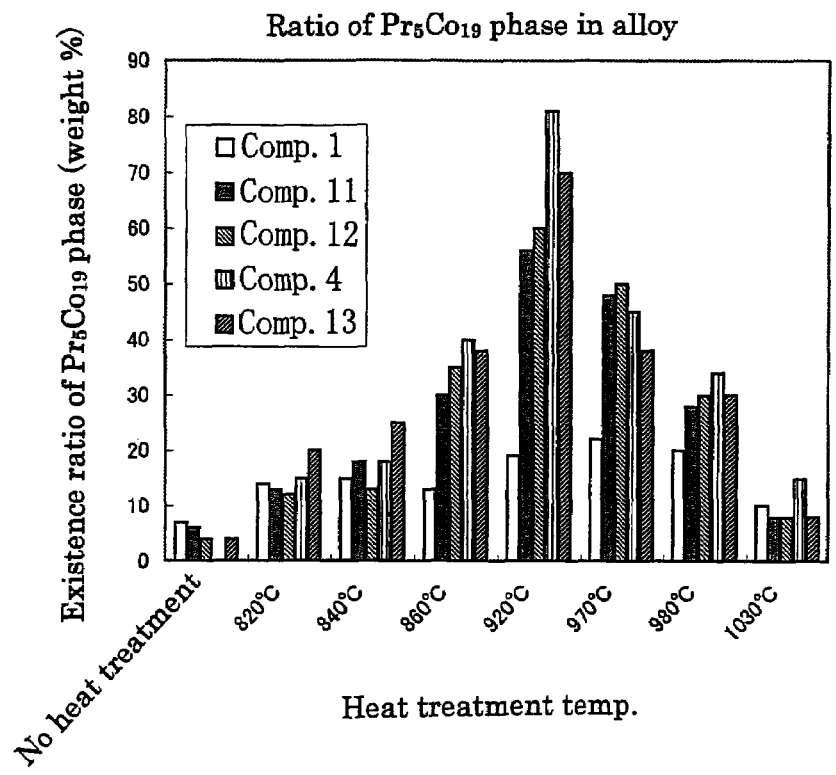
FIG. 9: A drawing showing a relation between the heat treatment temperature and the existence ratio of the Pr$_5$Co$_{19}$ type crystal structure phase.
Figure 10:
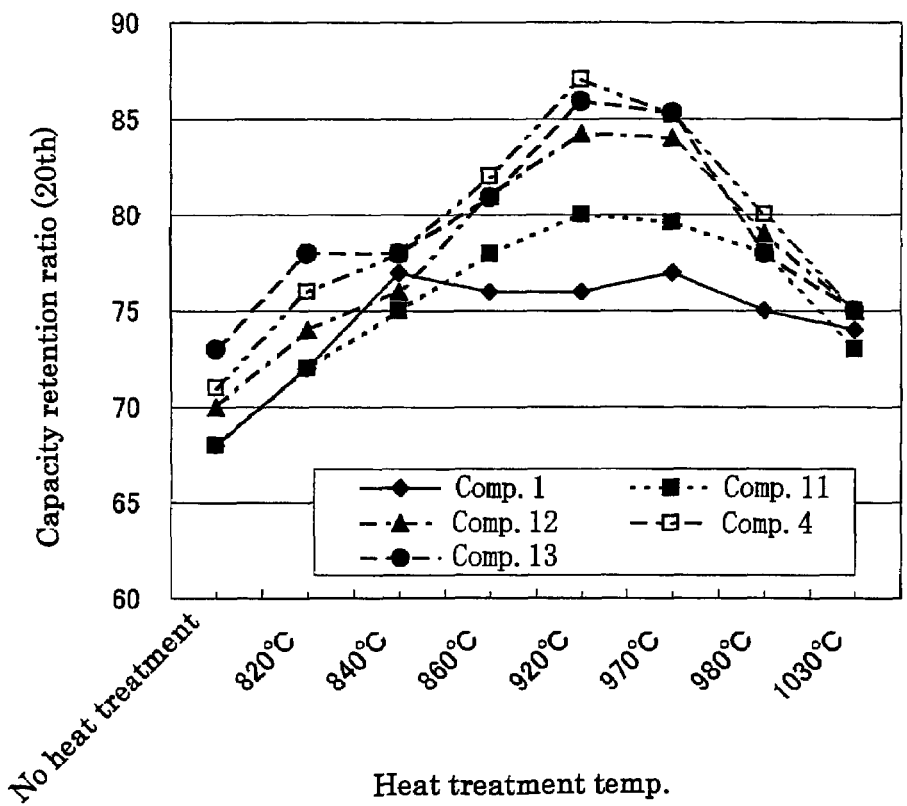
FIG. 10: A drawing showing a relation between the heat treatment temperature and the capacity retention ratio.

The respective experiments and measurements were carried out in the same manner as in Experiment Example 1, except that as shown in Table 11, raw material ingots having chemical compositions with different contents of an Ni element were used. The production ratios of the phase of the $Pr_5Co_{19}$ type crystal structure are shown in Table 11 and FIG. 9 and the measurement results of the capacity retention ratios are shown in Table 12 and FIG. 10.

TABLE 11

Production ratio of $Pr_5Co_{19}$ type crystal structure phase (weight %)

| Chemical composition | | No heat treatment | 820° C. | 840° C. | 860° C. | 920° C. | 970° C. | 980° C. | 1030° C. |
|---|---|---|---|---|---|---|---|---|---|
| $La_{17.0}Mg_{4.3}Ni_{76.6}Mn_{2.1}$ | Composition 1 (containing no Cu) | 7 | 14 | 15 | 13 | 19 | 22 | 20 | 10 |
| $La_{17.8}Mg_{4.4}Ni_{71.1}Mn_{2.2}Cu_{4.4}$ | Composition 11 | 6 | 13 | 18 | 30 | 56 | 48 | 28 | 8 |
| $La_{17.4}Mg_{4.3}Ni_{71.7}Mn_{2.2}Cu_{4.3}$ | Composition 12 | 4 | 12 | 13 | 35 | 60 | 50 | 30 | 8 |
| $La_{17.0}Mg_{4.3}Ni_{72.3}Mn_{2.1}Cu_{4.3}$ | Composition 4 (standard) | 0 | 15 | 18 | 40 | 81 | 45 | 34 | 15 |
| $La_{16.7}Mg_{4.2}Ni_{72.9}Mn_{2.1}Cu_{4.3}$ | Composition 13 | 4 | 20 | 25 | 38 | 70 | 38 | 30 | 8 |

TABLE 12

Results of capacity retention ratio (5)

| | No heat treatment | 820° C. | 840° C. | 860° C. | 920° C. | 970° C. | 980° C. | 1030° C. |
|---|---|---|---|---|---|---|---|---|
| Composition 1 (containing no Cu) | 68 | 72 | 77 | 76 | 76 | 77 | 75 | 74 |
| Composition 11 | 68 | 72 | 75 | 78 | 80 | 80 | 78 | 73 |
| Composition 12 | 70 | 74 | 76 | 81 | 84 | 84 | 79 | 75 |
| Composition 4 (standard) | 71 | 76 | 78 | 82 | 87 | 85 | 80 | 75 |
| Composition 13 | 73 | 78 | 78 | 81 | 86 | 85 | 78 | 75 |

The invention claimed is:

1. A hydrogen absorbing alloy containing a phase of a $Pr_5Co_{19}$ crystal structure having a composition defined by a general formula $A_{4-w}B_{1+w}C_{19}$ wherein A denotes one or more elements selected from rare earth elements including Y (yttrium); B denotes an Mg element; C denotes one or more elements selected from the a group consisting of Ni, Co, Mn, and Al; and w denotes a numeral in a range from −0.1 to 0.8 and having a composition as a whole defined by a general formula $R1_xR2_yR3_z$ wherein $15.8 \leq x \leq 17.8$, $3.4 \leq y \leq 5.0$, $78.8 \leq z \leq 79.6$, and $x+y+z=100$;

wherein R1 denotes one or more elements selected from rare earth elements including Y (yttrium); R2 denotes Mg; R3 denotes one or more elements selected from a group consisting of Ni, Co, Mn, and Al; the numeral Mn+Al in said z is 0.5 or higher; and the numeral of Al in said z is 4.1 or lower.

2. The hydrogen absorbing alloy according to claim 1, wherein in said general formula $R1_xR2_yR3_z$, said x, y, and z satisfy $16.3 \leq x \leq 17.6$, $3.6 \leq y \leq 4.7$, and $78.8 \leq z \leq 79.1$; the numeral of Mn+Al in said z is 1.6 or higher; and the numeral of Al in said z is 1.9 or lower.

3. The hydrogen absorbing alloy according to claim 1, wherein the phase of said $Pr_5Co_{19}$ crystal structure is formed at a ratio of 8 weight % or more.

4. The hydrogen absorbing alloy according to claim 1, wherein the alloy has a primary grain size of 10 to 100 nm.

5. A hydrogen absorbing alloy production method for producing the hydrogen absorbing alloy according to claim 1, wherein the method comprises steps of cooling a melted alloy at a cooling speed of 1000 K/second or more and further annealing the obtained alloy at a temperature in a range from 860 to 1020° C. in an inert gas atmosphere under a pressurized state.

6. A hydrogen absorbing alloy electrode using the hydrogen absorbing alloy according to claim 1 as a hydrogen storage medium.

7. A secondary battery provided with the hydrogen absorbing alloy electrode according to claim 6.

* * * * *

UNITED STATES PATENT AND TRADEMARK OFFICE
CERTIFICATE OF CORRECTION

| | | |
|---|---|---|
| PATENT NO. | : 7,951,326 B2 | |
| APPLICATION NO. | : 12/063394 | |
| DATED | : May 31, 2011 | |
| INVENTOR(S) | : Kanemoto et al. | |

It is certified that error appears in the above-identified patent and that said Letters Patent is hereby corrected as shown below:

In claim 1, column 29, lines 35-36, reading "B denotes an Mg element;" should read --B denotes Mg--.

In claim 1, column 29, line 37, reading "the a group consisting of" should read --a group consisting of--.

In claim 1, column 29, lines 45-46, reading "the numeral Mn+Al" should read --the numeral of Mn+Al--.

Signed and Sealed this
Fourth Day of October, 2011

David J. Kappos
*Director of the United States Patent and Trademark Office*